(12) United States Patent
Delattre et al.

(10) Patent No.: US 9,480,363 B2
(45) Date of Patent: Nov. 1, 2016

(54) BABY BOTTLE WARMER

(76) Inventors: Thomas Delattre, Stuart, FL (US);
Michael Romeo, Port St. Lucie, FL (US); Raymond Beja, Port Salerno, FL (US); David Carson, Stuart, FL (US); Eric Davis Schwartz, Palm Beach Gardens, FL (US)

( * ) Notice: Subject to any disclaimer, the term of this patent is extended or adjusted under 35 U.S.C. 154(b) by 886 days.

(21) Appl. No.: 13/229,350

(22) Filed: Sep. 9, 2011

(65) Prior Publication Data

US 2012/0064470 A1 Mar. 15, 2012

Related U.S. Application Data

(60) Provisional application No. 61/381,277, filed on Sep. 9, 2010.

(51) Int. Cl.
*F23L 15/04* (2006.01)
*A47J 36/24* (2006.01)

(52) U.S. Cl.
CPC .................... *A47J 36/2433* (2013.01)

(58) Field of Classification Search
CPC .. A47J 36/24; A47J 36/2411; A47J 36/2416; A47J 36/2422; A47J 36/2427; A47J 36/2433; A47J 36/2444
USPC .......... 432/29, 36, 48; 219/385–387
See application file for complete search history.

(56) References Cited

U.S. PATENT DOCUMENTS

| | | | | |
|---|---|---|---|---|
| 2,128,016 A * | 8/1938 | Sinko | ............................ | 219/269 |
| 2,516,637 A * | 7/1950 | McCollum | ..................... | 219/433 |
| 2,526,447 A * | 10/1950 | Aiken | ........................... | 219/433 |
| 3,152,245 A | 10/1964 | Litman | | |
| 3,892,945 A * | 7/1975 | Lerner | ........................... | 219/437 |
| 4,801,782 A | 1/1989 | Ineson | | |
| 5,436,429 A * | 7/1995 | Cline | ........................... | 219/202 |
| 5,842,353 A * | 12/1998 | Kuo-Liang | ......... | A47G 19/2288 219/419 |
| 5,975,337 A * | 11/1999 | Hadley | ..................... | 220/592.17 |
| 6,072,161 A * | 6/2000 | Stein | .................... | A47J 36/2472 219/386 |
| 6,403,928 B1 * | 6/2002 | Ford | .................... | A47J 36/2461 219/386 |
| 6,528,766 B1 | 3/2003 | Parks | | |
| 6,554,466 B1 * | 4/2003 | Lee | ...................... | A47J 43/0777 241/37.5 |
| 6,639,186 B1 | 10/2003 | Perez | | |
| 2003/0137168 A1 * | 7/2003 | Kain | .................... | B60N 2/2812 297/188.21 |
| 2006/0081599 A1 | 4/2006 | Anderson | | |
| 2006/0264831 A1 * | 11/2006 | Skwarek | ............ | A61B 18/1206 604/151 |
| 2007/0204851 A1 | 9/2007 | Justo | | |
| 2007/0223895 A1 * | 9/2007 | Flemm | ................ | A47J 36/2433 392/441 |

(Continued)

*Primary Examiner* — Gregory Huson
*Assistant Examiner* — Nathaniel Herzfeld
(74) *Attorney, Agent, or Firm* — Akerman LLP; Mammen (Roy) P. Zachariah, Jr.

(57) ABSTRACT

An bottle warming apparatus may be provided. The apparatus may include a bottle for storing food and fluids. The bottle may include a recessed portion and indentations positioned on opposite sides of the bottle. Additionally, the apparatus may include a bottle housing configured to receive the bottle. The apparatus may also include a heating element that is positionable into the recessed portion of the bottle. Furthermore, the apparatus may include a pressure-sensitive switch that activates the apparatus when the bottle exerts enough pressure against the switch as the bottle is positioned into the bottle housing. Heat may be generated by the heating element when the apparatus is activated and be utilized to warm the bottle. The apparatus may further include a temperature sensor for measuring a temperature of the bottle. A signal may be transmitted to instruct the apparatus to deactivate when an optimal temperature is reached.

20 Claims, 29 Drawing Sheets

(56) References Cited

U.S. PATENT DOCUMENTS

| | | | |
|---|---|---|---|
| 2008/0041859 A1* | 2/2008 | Teglbjarg | A47J 36/2411 220/592.16 |
| 2008/0087270 A1 | 4/2008 | Shaikh | |
| 2008/0118614 A1* | 5/2008 | Kehoe | A47J 27/10 426/231 |
| 2008/0178865 A1* | 7/2008 | Retterer | 126/263.08 |
| 2008/0179311 A1 | 7/2008 | Koro | |
| 2008/0251063 A1 | 10/2008 | Palena | |
| 2010/0025414 A1* | 2/2010 | Mansour | B65D 81/3886 220/738 |
| 2010/0089901 A1* | 4/2010 | Montana | A47J 36/2466 219/385 |

* cited by examiner

130

BABY BOTTLE WARMER

RELATED APPLICATIONS AND PRIORITY

The present application claims priority to U.S. Provisional Application No. 61/381,277, filed Sep. 9, 2010, the entirety of which is hereby incorporated by reference.

FIELD OF THE INVENTION

The present application relates to temperature regulating devices, methods, and apparatuses, and more particularly to a baby bottle warmer.

BACKGROUND

Baby bottles and other similar drinking devices are utilized to assist toddlers and babies in consuming different types of drinks and foods in a safe manner. Such devices tend to be more convenient for babies to drink from because they have a nipple that the babies can directly drink from easily. Even though traditional baby bottles are more convenient to drink from than conventional glasses or cups, traditional baby bottles may still not offer enough convenience, safety features, or other features. As a result, companies and families have developed and used different types of heating methods and devices to try to ensure that baby bottles and other drinking devices adequately protect babies from extremes in temperature and from dangerous parts, while also offering the babies a convenient way of consuming food. There are a variety of different types of devices and methods used for regulating the temperature of food and drinks for babies. For example, heat packs, gel packs, thermal sleeves, thermoses, heat-shielding devices, and various types of baby bottles have been developed to regulate the temperature of food and drinks that babies consume.

Although these and a variety of other devices exist for regulating the temperature of food and drinks that babies consume, such devices can often be cumbersome, time consuming to set up, unsafe, and may not adequately regulate the temperature of food or drinks. For example, heat packs and gel packs may become too hot or too cold if they are microwaved, boiled, or frozen and may ultimately be too dangerous for babies. Additionally, many existing temperature regulating devices fail in keeping food or drinks at an adequate temperature for an extended duration. Finally, existing products may further include a multitude of components that may too easily cause injuries to babies.

SUMMARY

In accordance with one aspect of the exemplary embodiments provided herein, a bottle warming apparatus may be provided. The apparatus may include a bottle having a first volume configured to receive and store food or fluids. The bottle may include a recessed portion and first and second indentations that may be positioned on opposite sides of the bottle. Additionally, the apparatus may include a bottle housing for enclosing the bottle, wherein an inner wall of the bottle housing may define a second volume having a size and shape for receiving at least a portion of the bottle. The apparatus may also include a heating element configured to be positioned within the recessed portion of the bottle when the bottle is positioned into the bottle housing. Furthermore, the apparatus may include a pressure-sensitive switch configured to align with the first indentation of the bottle and activate the bottle warming apparatus when the bottle positions into the bottle housing and applies pressure against the pressure-sensitive switch. The heating element may generate and transmit heat to the bottle when the bottle warming apparatus is activated. Moreover, the apparatus may include a temperature sensor for measuring a temperature of the bottle, wherein the temperature sensor aligns with the second indentation when the bottle is positioned into the bottle housing. The temperature sensor may transmit a signal to the bottle warming apparatus to deactivate the bottle warming apparatus when an optimal temperature is reached.

In accordance with another exemplary embodiment, a method for warming a bottle using a bottle warming apparatus, which can include, but is not limited to including, the steps of: inserting a bottle into a bottle housing of the bottle warming apparatus, wherein the bottle includes a first volume for receiving and storing at least one of food or fluid, wherein the bottle includes a recessed portion and first and second indentations positioned on opposite sides of the bottle; triggering a pressure-sensitive switch to activate the bottle warming apparatus when the bottle is inserted into the bottle housing, wherein the pressure-sensitive switch is configured to align with the first indentation of the bottle; activating the bottle warming apparatus after triggering the pressure-sensitive switch, wherein the bottle warming apparatus transmits a signal to a heating element to generate heat; warming the bottle by utilizing the heating element; measuring a temperature of the bottle by utilizing a temperature sensor, wherein the temperature sensor aligns with the second indentation when the bottle is inserted into the bottle housing; and deactivating the bottle warming apparatus and the heating element when the temperature reaches an optimal temperature.

In accordance with another exemplary embodiment, another bottle warming apparatus may be provided. The bottle warming apparatus may include a bottle having a first volume configured to receive and store food or fluid. The bottle may include a recessed portion. Additionally, the bottle warming apparatus may include a bottle housing having an inner wall defining a second volume for receiving at least a portion of the bottle. The bottle warmer apparatus may also include a heating element configured to position within the recessed portion of the bottle when the bottle is positioned into the bottle housing. The bottle warming apparatus may include a pressure-sensitive switch configured to activate the bottle warming apparatus when the bottle positions into the bottle housing and applies pressure against the pressure-sensitive switch. The heating element may generate and transmit heat to the bottle based on the activation of the bottle warming apparatus. Furthermore, the bottle warming apparatus may include a temperature sensor for measuring a temperature of the bottle, wherein the temperature sensor may transmit a signal to the bottle warming apparatus to deactivate the bottle warming apparatus when an optimal temperature is reached.

The above-described and other features and advantages of the present disclosure will be appreciated and understood by those skilled in the art from the following detailed description, drawings, and appended claims.

DETAILED DESCRIPTION OF THE INVENTION

The exemplary embodiments of the present disclosure are described with respect to bottle warming apparatuses and methods for warming a bottle using bottle warming apparatuses. A bottle warming apparatus according to the present disclosure may include a bottle, which may be utilized to hold or store food, liquids, or other contents. In one embodiment, the bottle may include a nipple and a recessed portion that may be located on the bottom of the bottle. Additionally, the bottle warming apparatus may include a bottle housing that may include an inner wall that may define a volume that can receive at least a portion of the bottle. A heating element may also be included in the bottle warming apparatus and may be configured to position within the recessed portion of the bottle when the bottle is positioned into the bottle housing. The bottle warming apparatus may further include a pressure-sensitive switch that may be used to turn on the bottle warming apparatus when the bottle applies enough pressure against the pressure-sensitive switch when being inserted into the housing.

When the bottle warming apparatus is turned on, the heating element may generate and transmit heat to the bottle, thereby causing the bottle to warm up. The bottle warming apparatus may also include a temperature sensor for measuring the temperature of the bottle at any given time. While the temperature sensor is monitoring and measuring the temperature, the temperature sensor may transmit a signal to the bottle warming apparatus to turn off the bottle warming apparatus when an optimal temperature is reached. It should be understood by one of ordinary skill in the art that the exemplary embodiments of the present disclosure can be applied to other types of bottle warming apparatuses and methods, such as those described below. Additionally, features of the exemplary embodiments can be used with each other and/or with alternative features that are not shown.

Figure 1A:
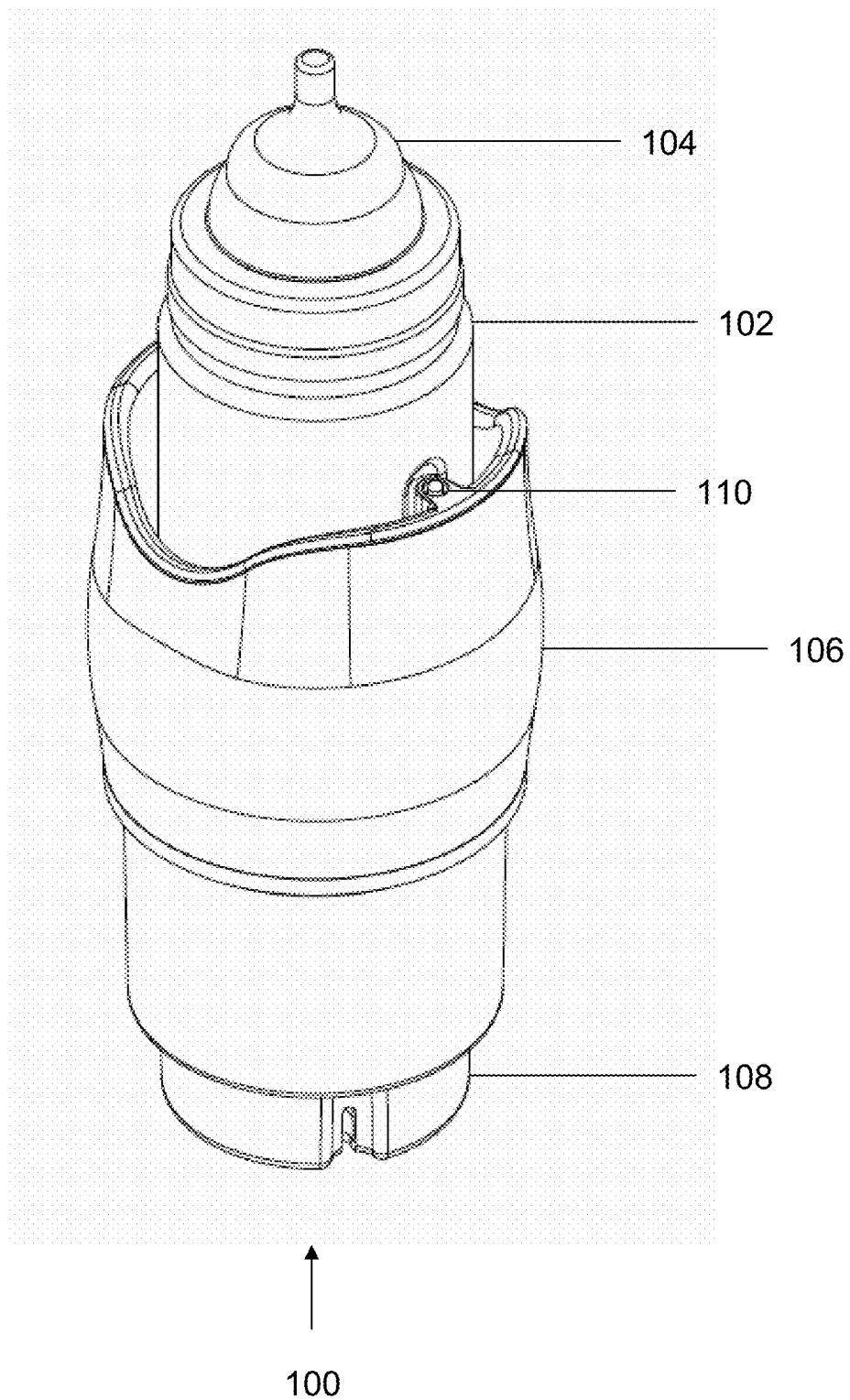
FIG. 1A illustrates an isometric view of a bottle warming apparatus according to one embodiment.
Figure 1B:
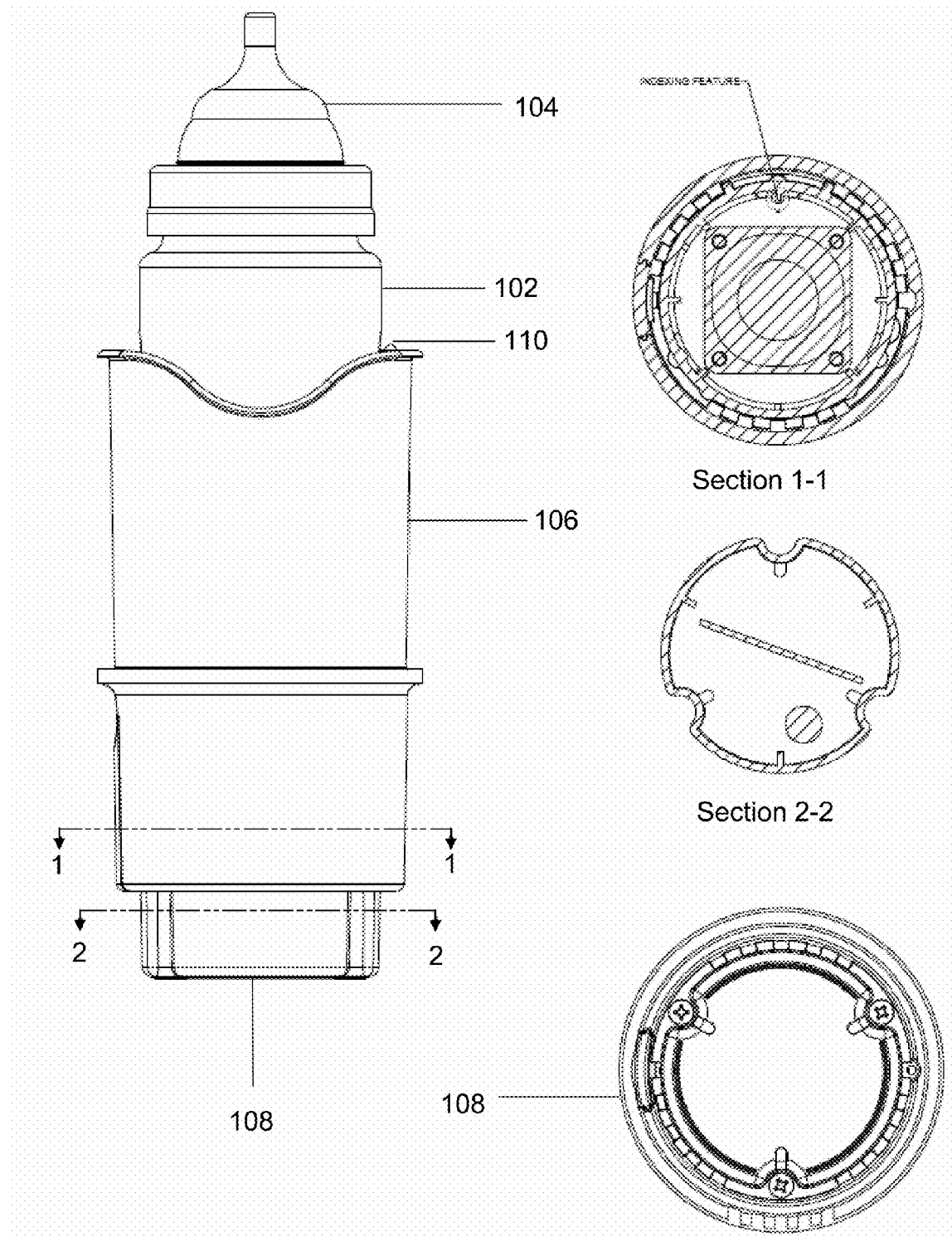
FIG. 1B illustrates a front view of the bottle warming apparatus of FIG. 1A and cross-sectional views of the bottom cover of the apparatus and the bottle housing.
Figure 1C:
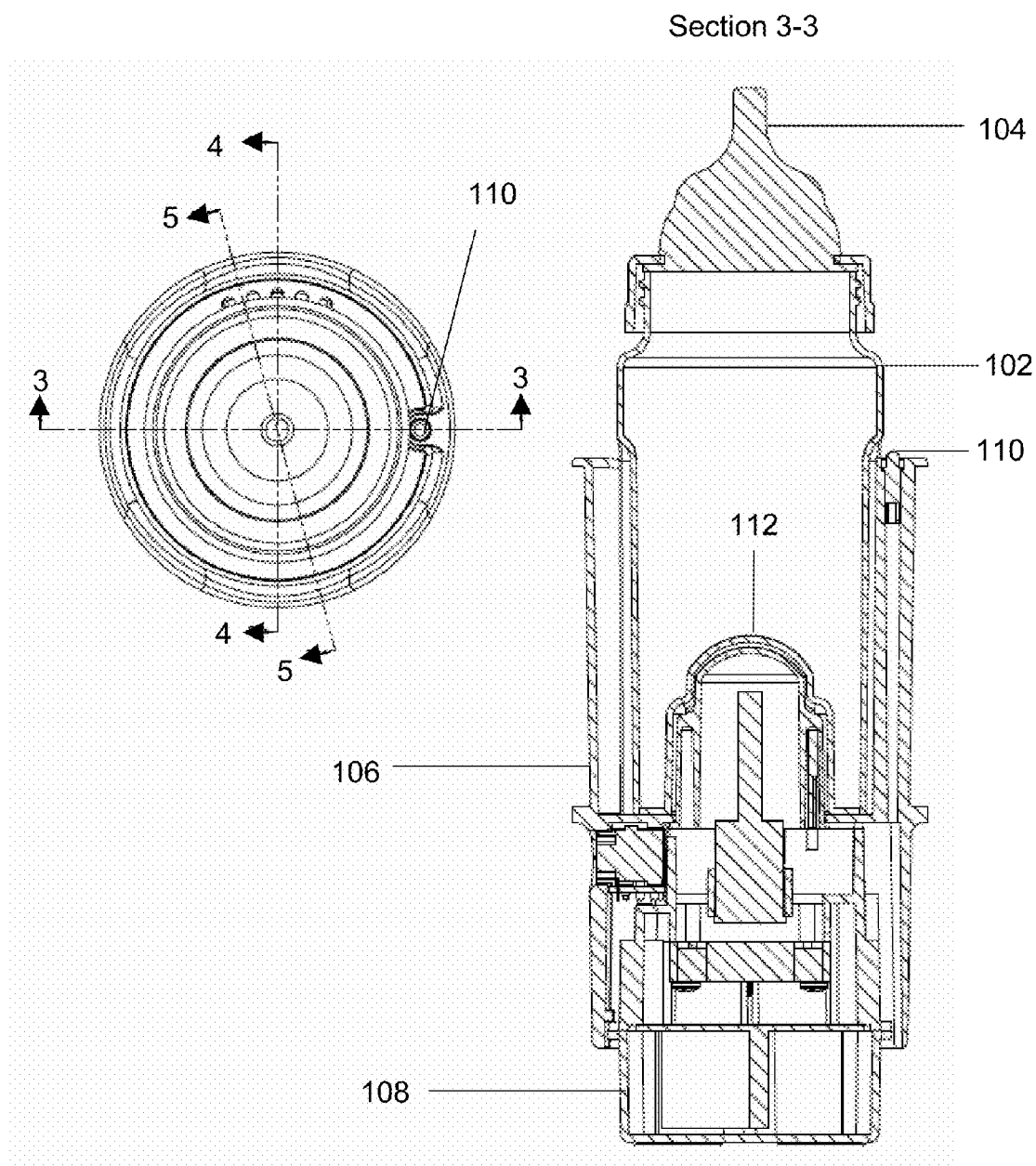
FIG. 1C illustrates a top and cross-sectional view of the bottle warming apparatus.
Figure 1D:
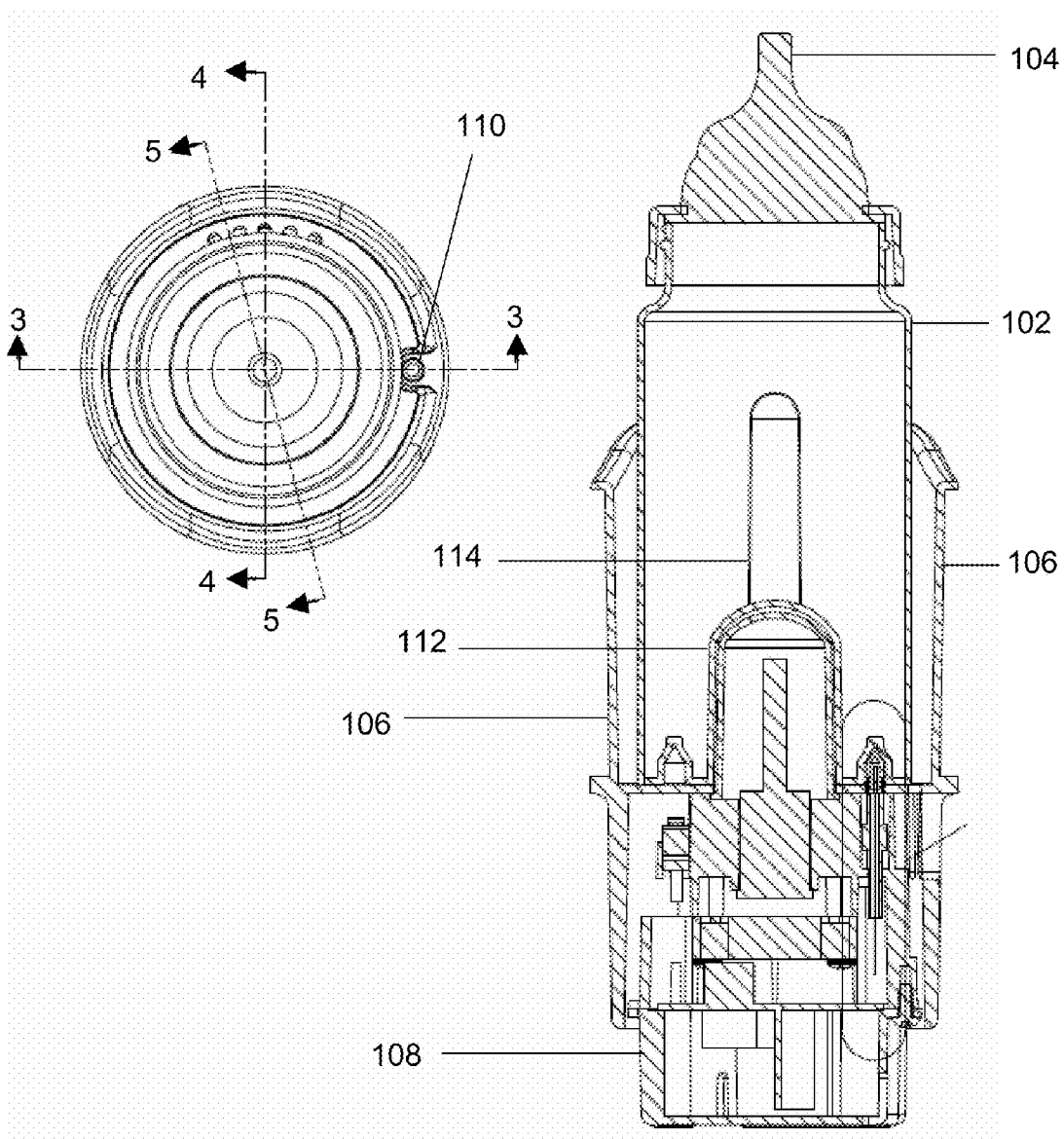
FIG. 1D illustrates the top view and a second cross-sectional view of the bottle warming apparatus.
Figure 1E:
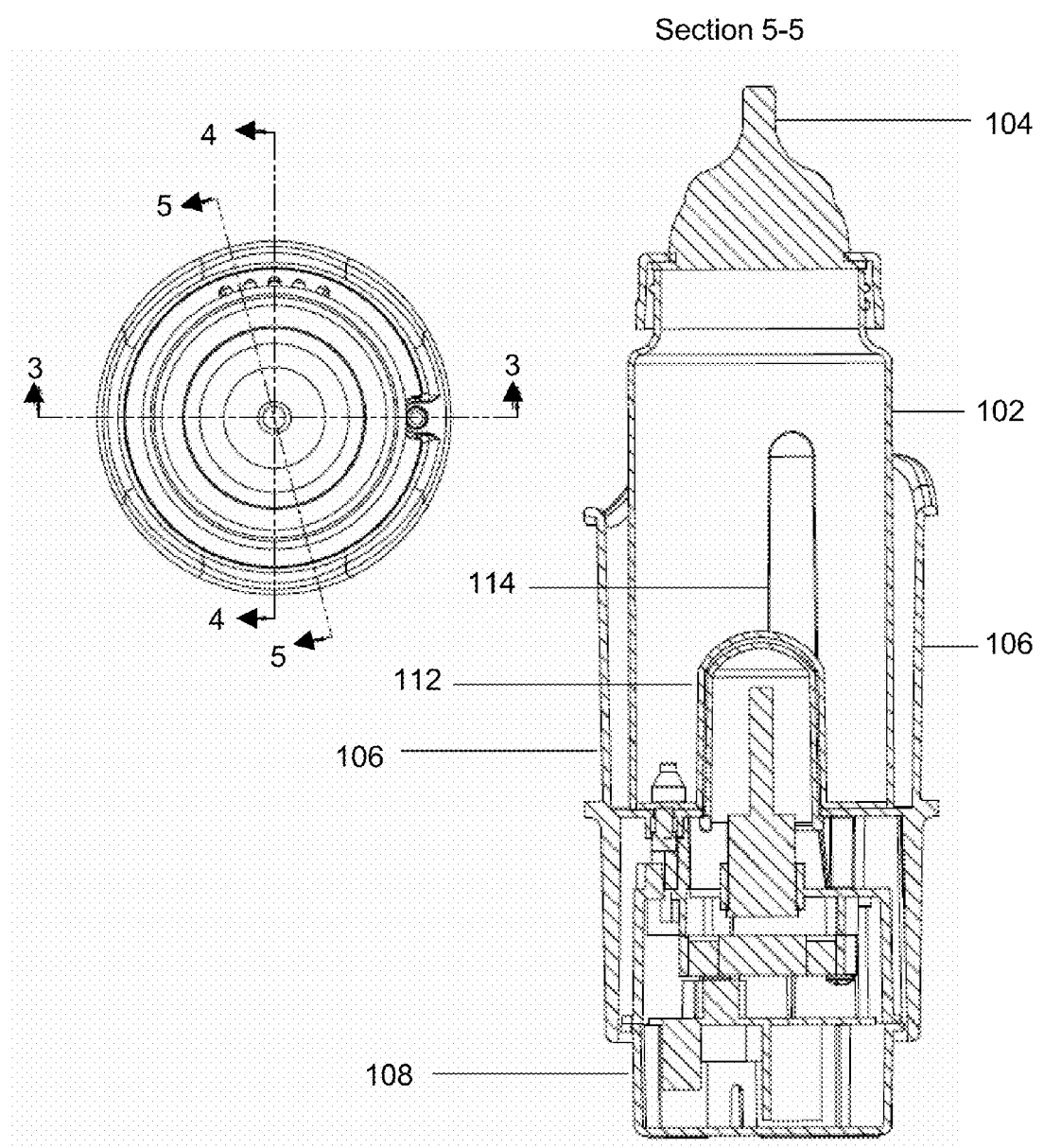
FIG. 1E illustrates the top view and a third cross-sectional view of the bottle warming apparatus.
Figure 1F:
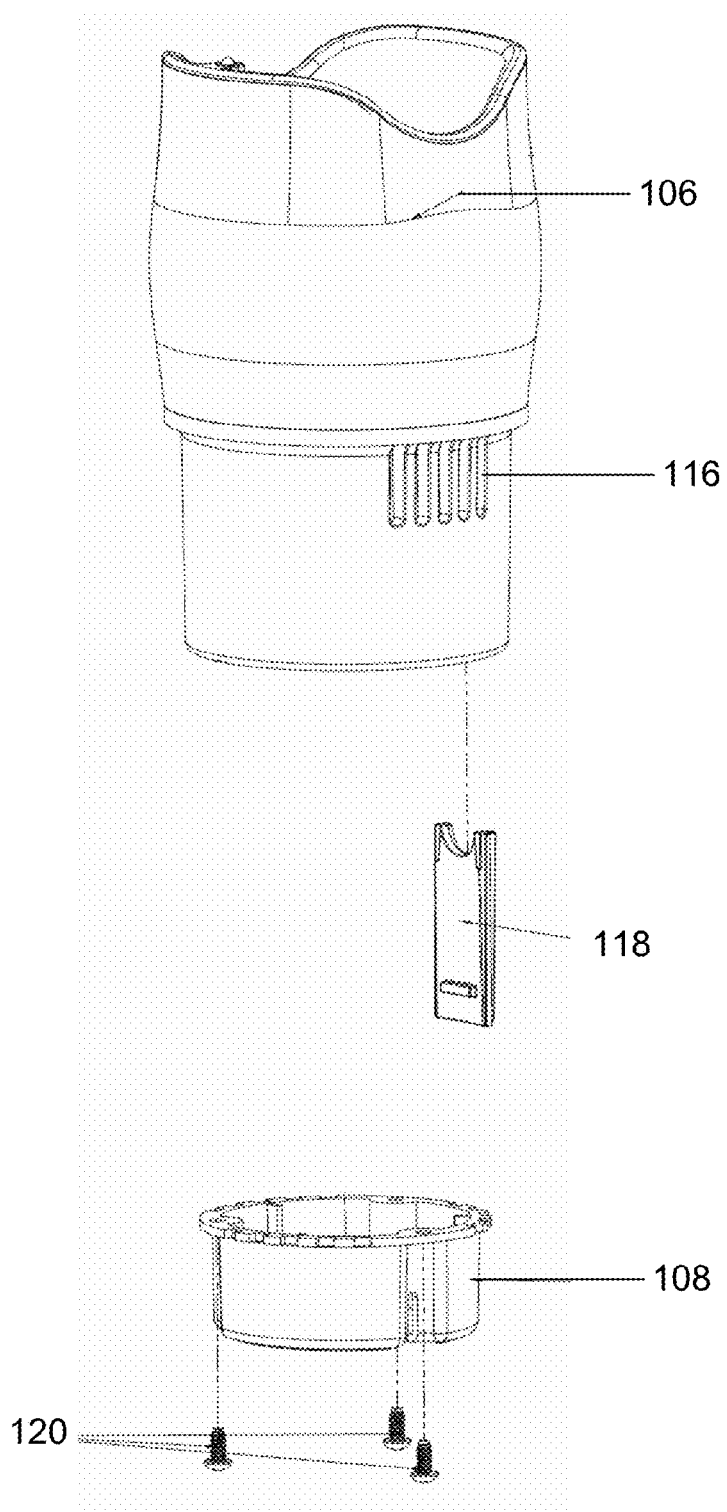
FIG. 1F illustrates an exploded view of the bottom cover and the bottle housing of the bottle warming apparatus.
Figure 1G:
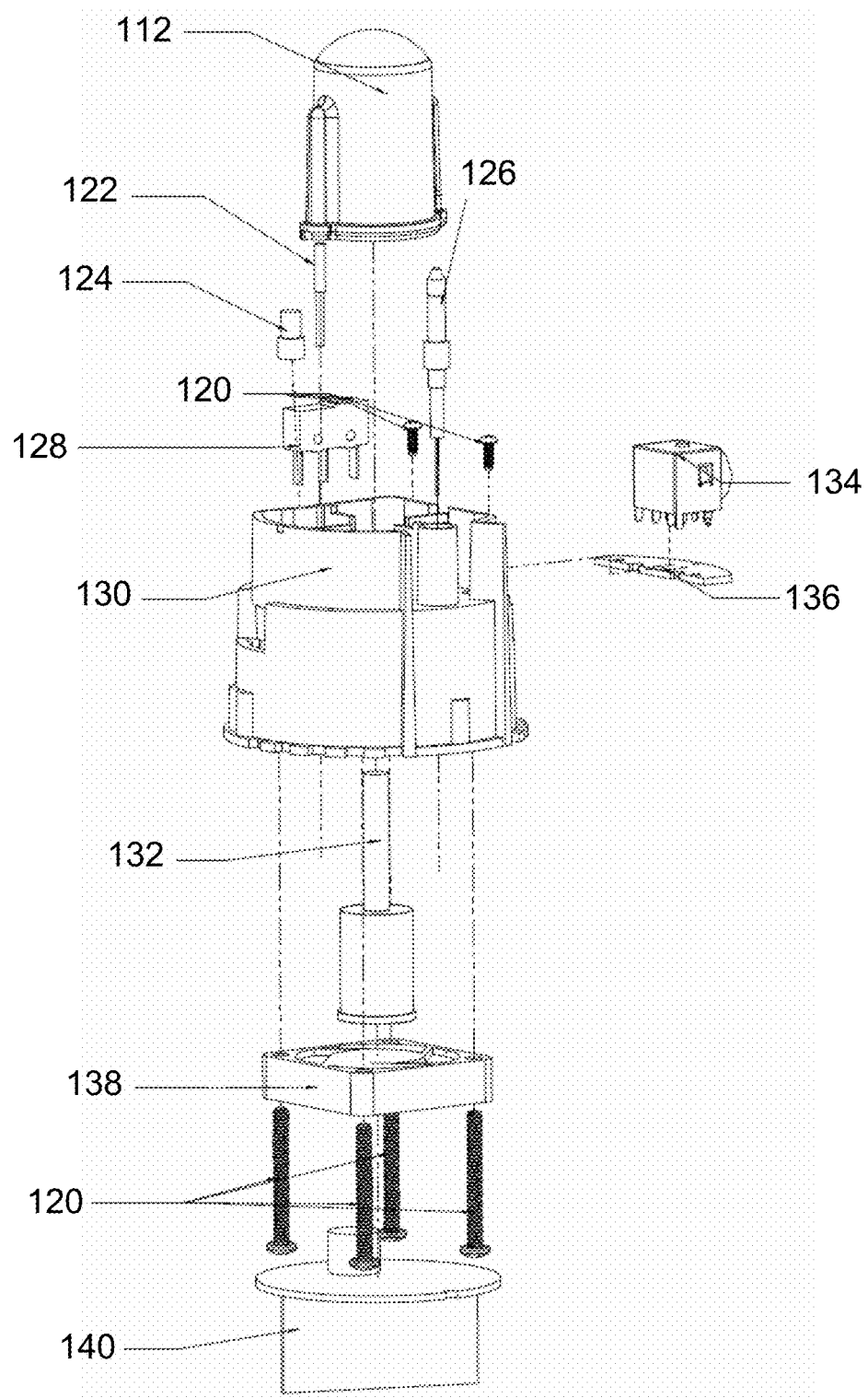
FIG. 1G illustrates an exploded view of additional components of the bottle warming apparatus.
Figure 2A:
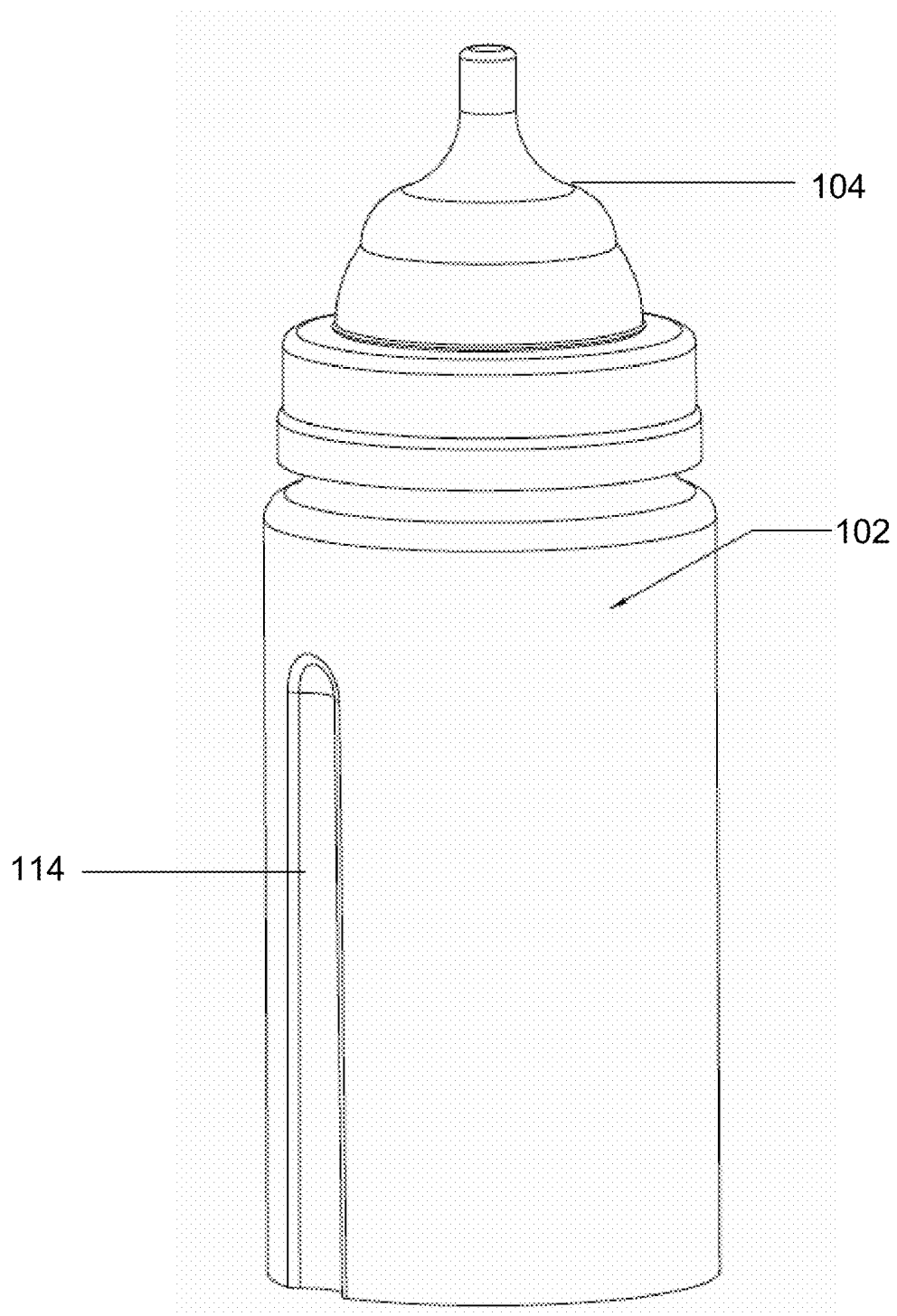
FIG. 2A illustrates a front view of the bottle of the bottle warming apparatus.
Figure 2B:
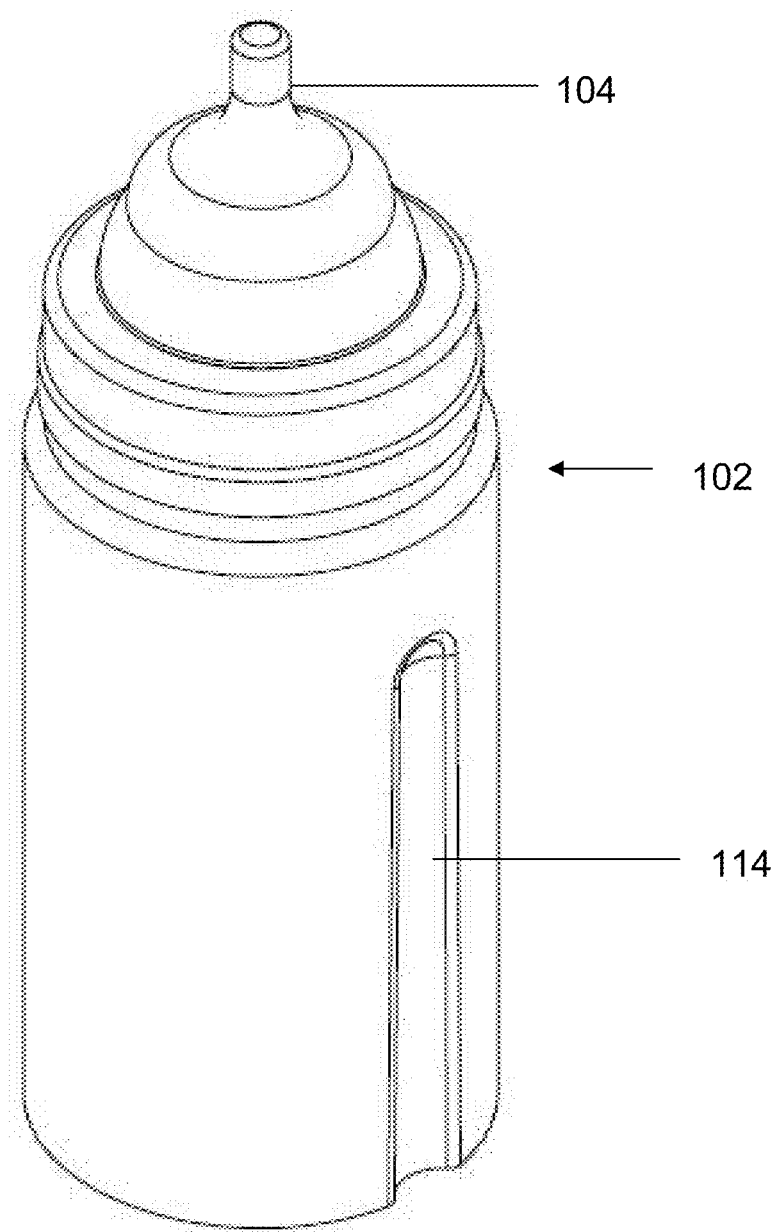
FIG. 2B illustrates an isometric view of the bottle of FIG. 2A.
Figure 2C:
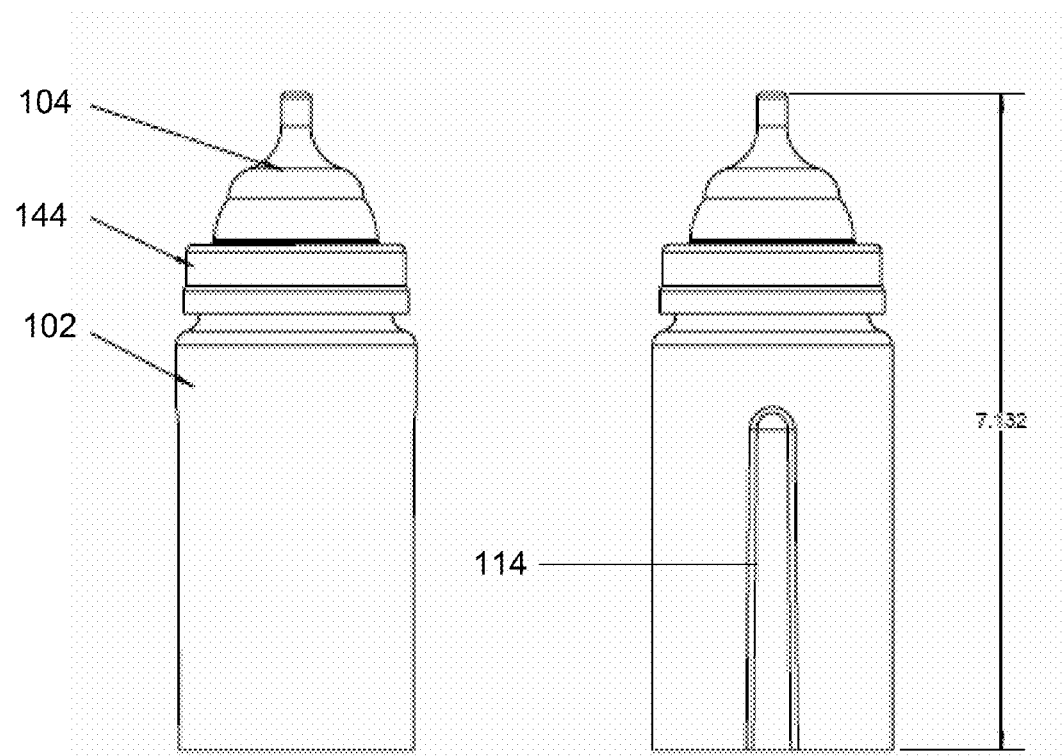
FIG. 2C illustrates front views of the outside of the bottle of FIG. 2A.
Figure 2D:
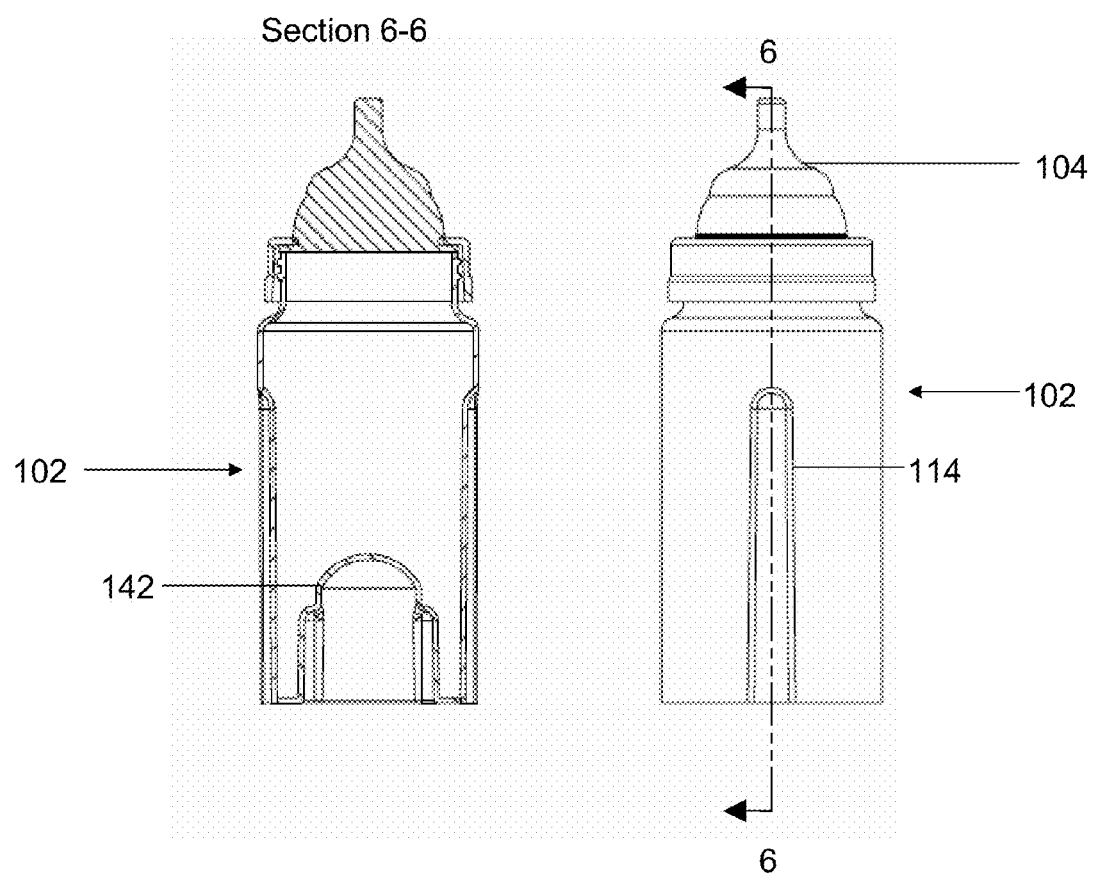
FIG. 2D illustrates a front view and a cross-sectional view of the bottle of FIG. 2A.
Figure 2E:
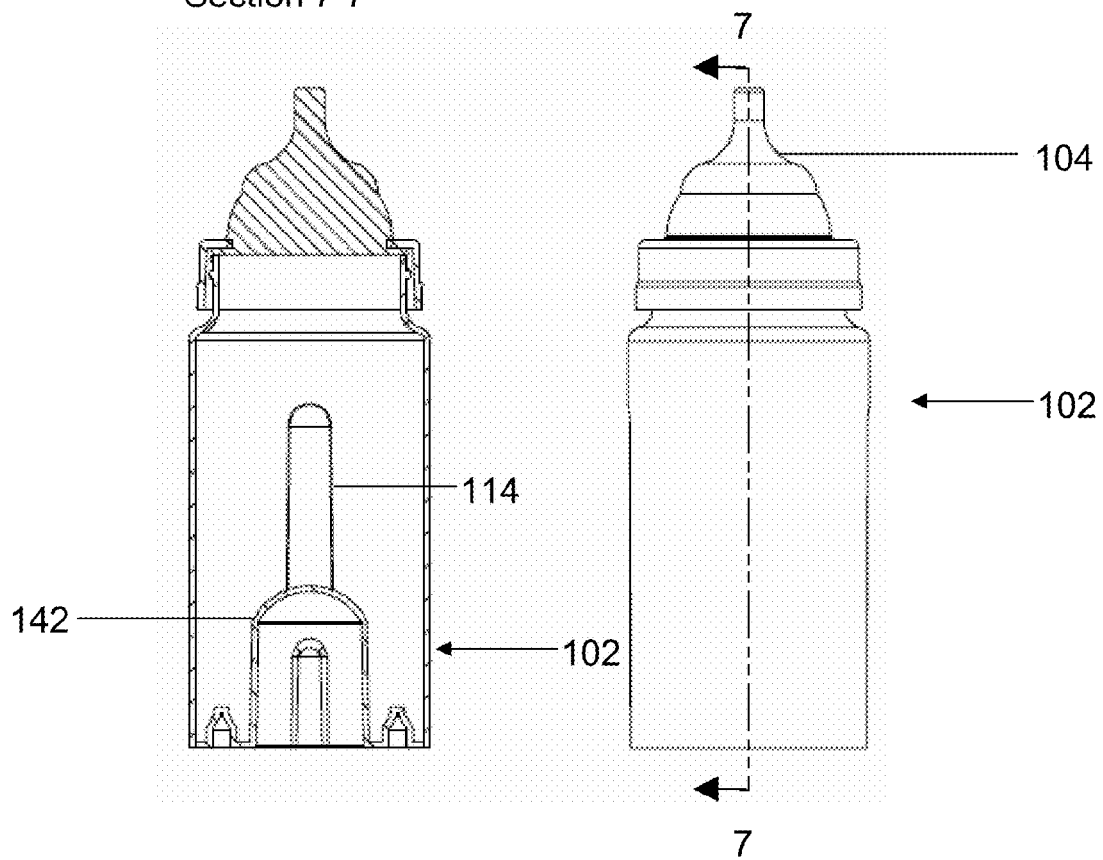
FIG. 2E illustrates a front view and a cross-sectional view of the bottle of FIG. 2A.
Figure 2F:
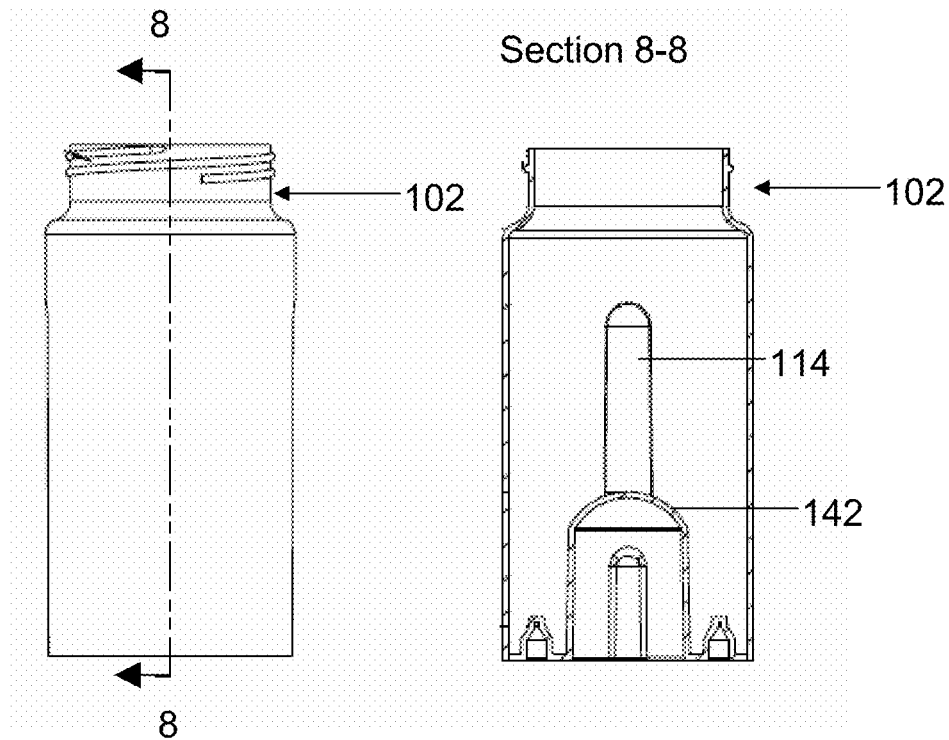
FIG. 2F illustrates a front view and a cross-sectional view of the bottle of FIG. 2A without a nipple.
Figure 2G:
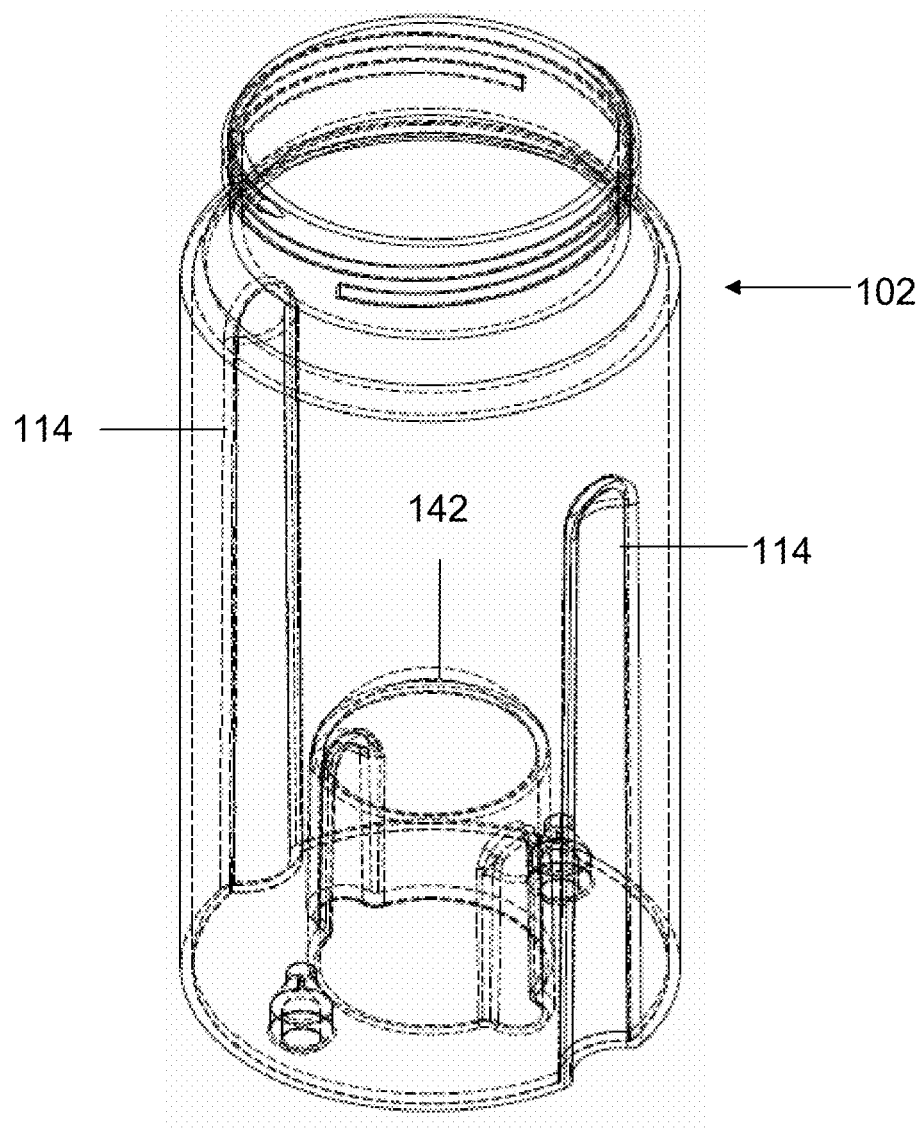
FIG. 2G illustrates an isometric view of the bottle of FIG. 2A without a nipple.
Figure 2H:
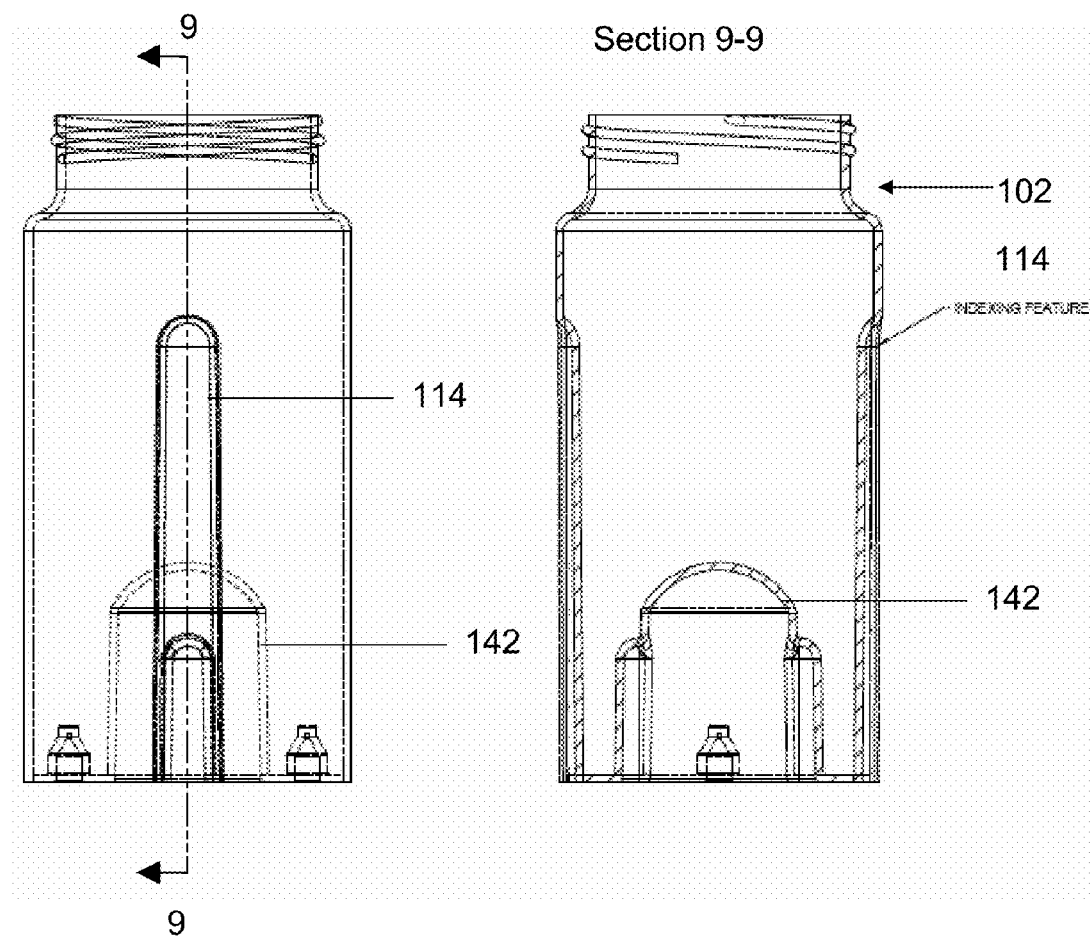
FIG. 2H illustrates a front view and cross-sectional view of the bottle of FIG. 2A without a nipple.
Figure 3A:
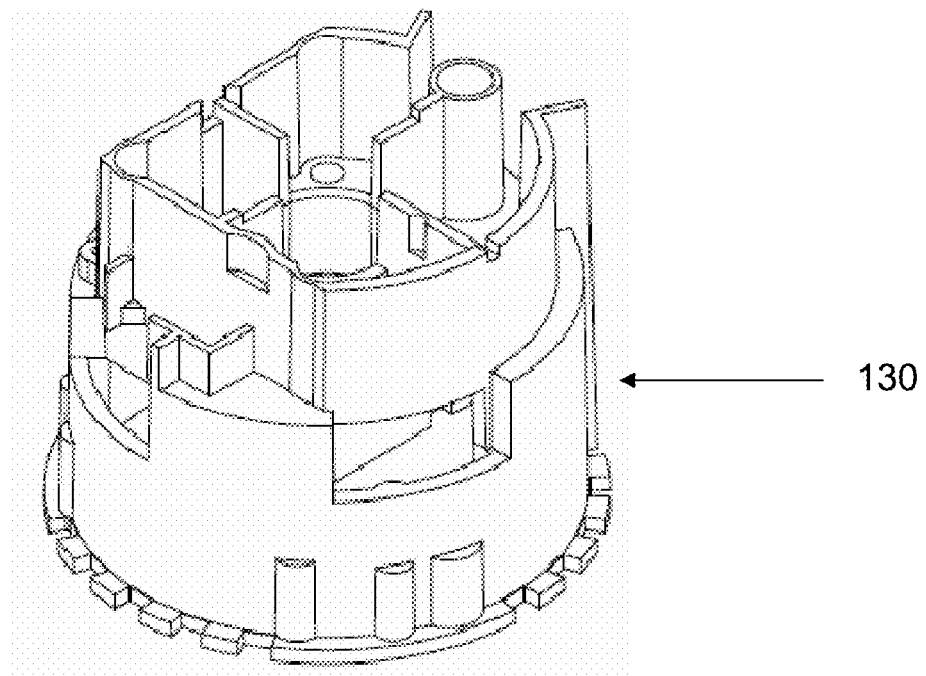
FIG. 3A illustrates an isometric view of a component mount section of the bottle warming apparatus.
Figure 3B:
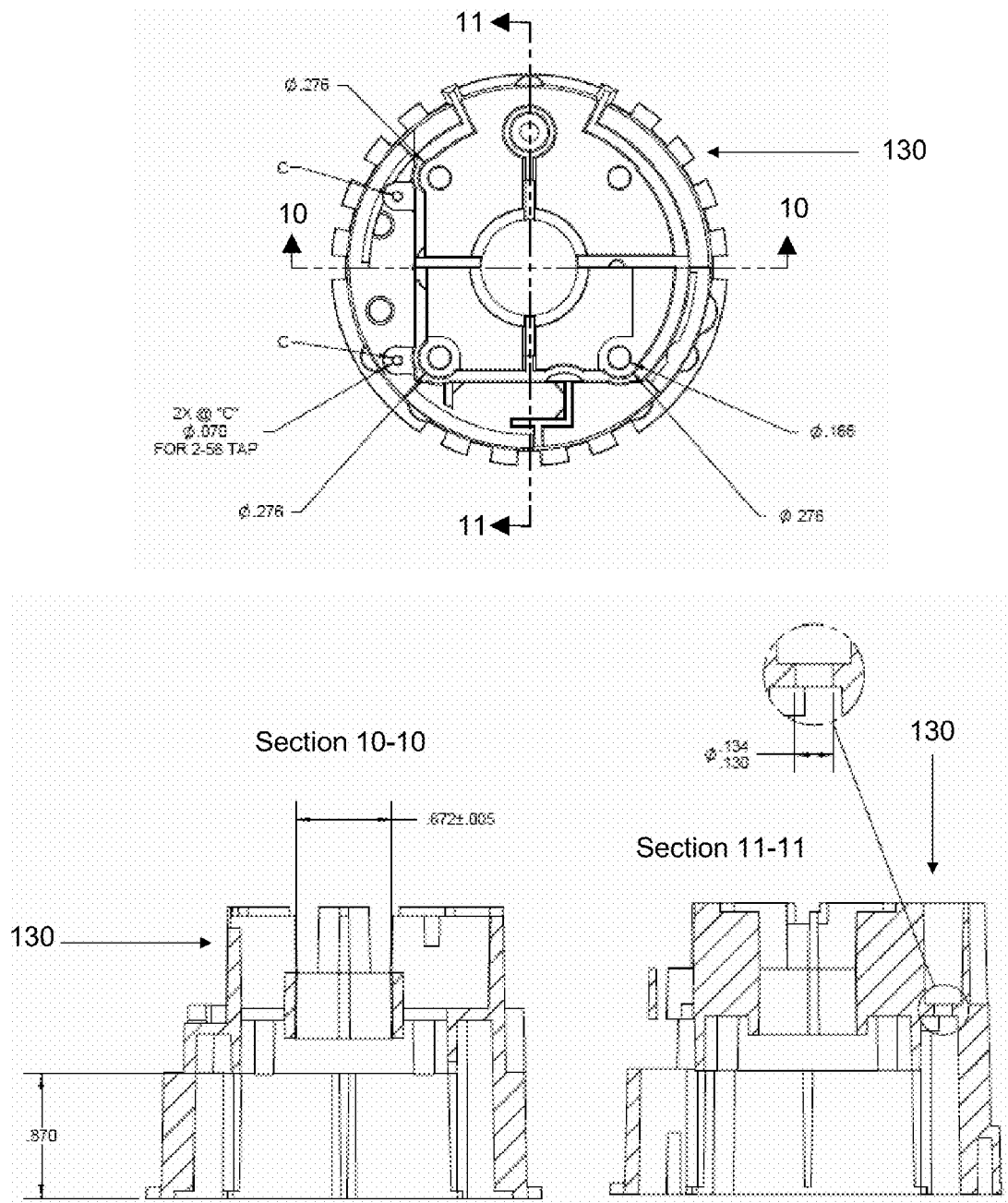
FIG. 3B illustrates top and cross-sectional views of the component mount section of the bottle warming apparatus.
Figure 3C:
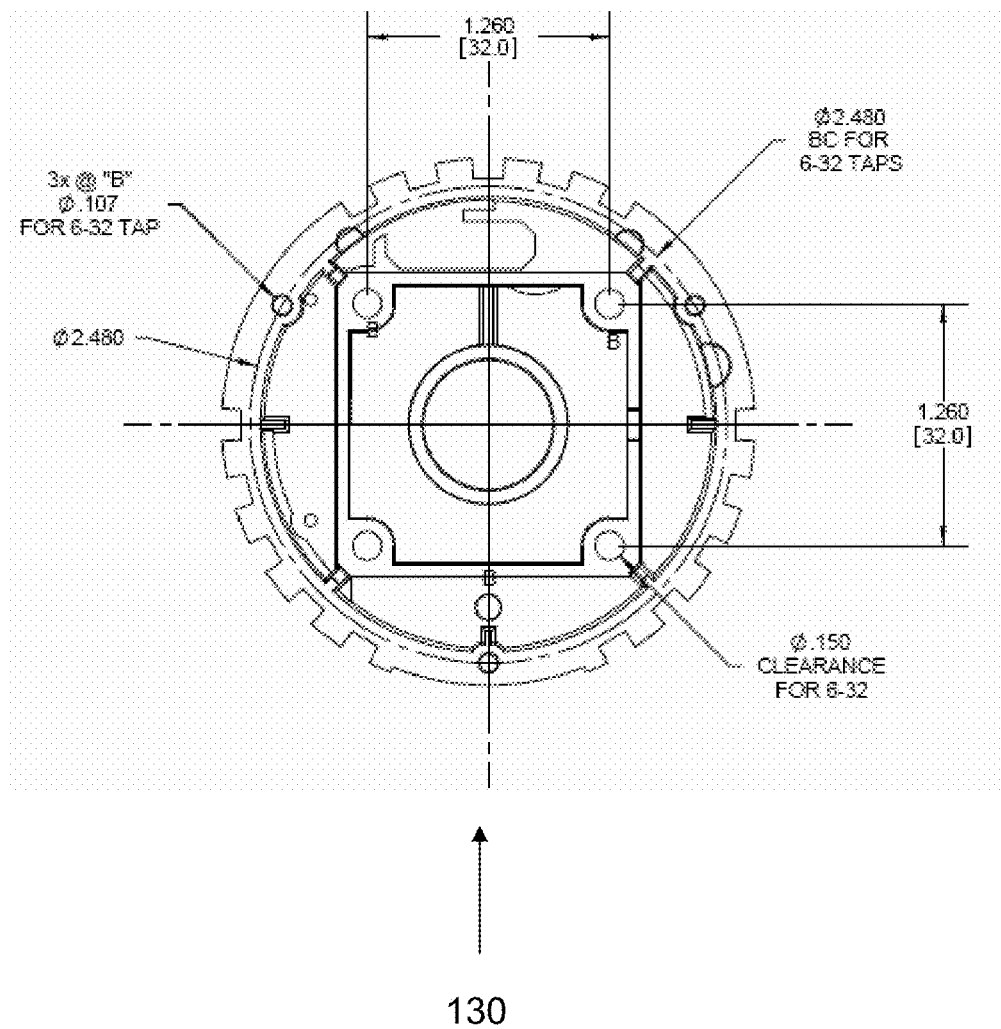
FIG. 3C illustrates a bottom view of the component mount section of the bottle warming apparatus
Figure 4A:
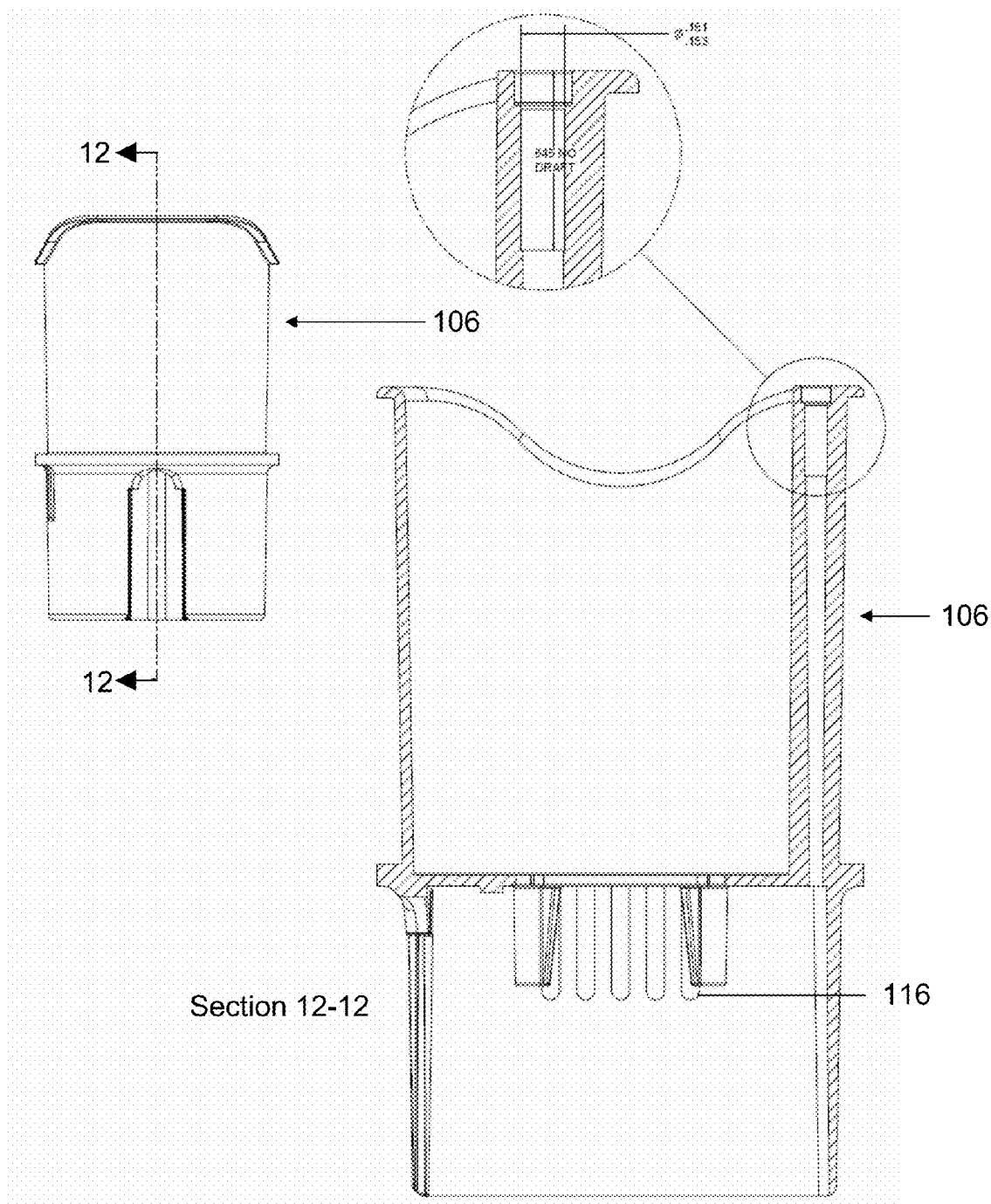
FIG. 4A illustrates front and cross-sectional views of the bottle housing of the bottle warming apparatus.
Figure 4B:
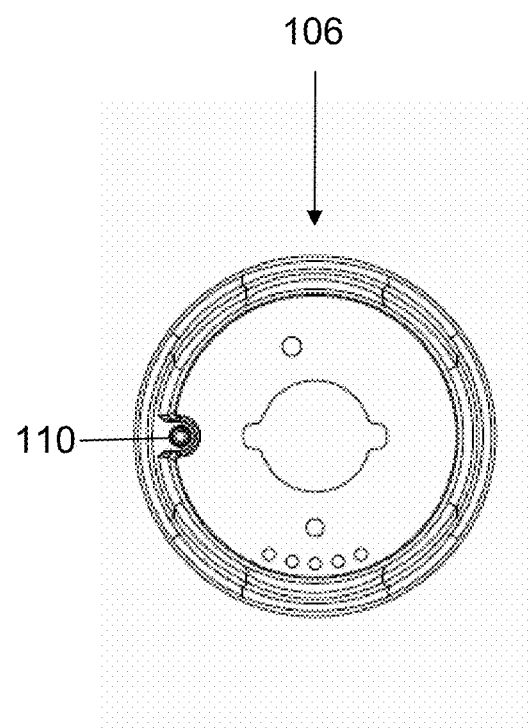
FIG. 4B illustrates a top view of the bottle housing.
Figure 4C:
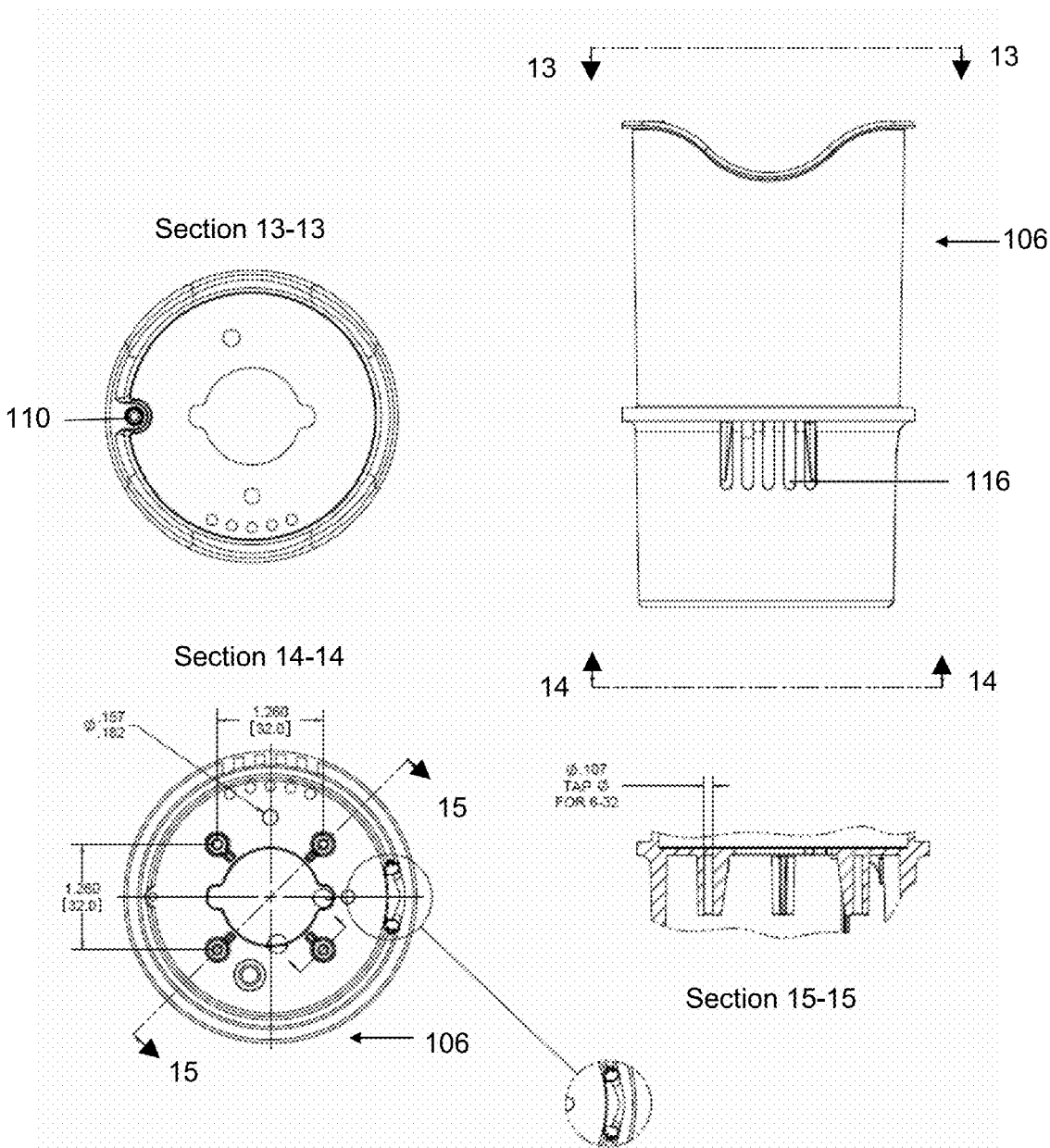
FIG. 4C illustrates top, bottom, cross-sectional, and front views of the bottle housing.
Figure 4D:
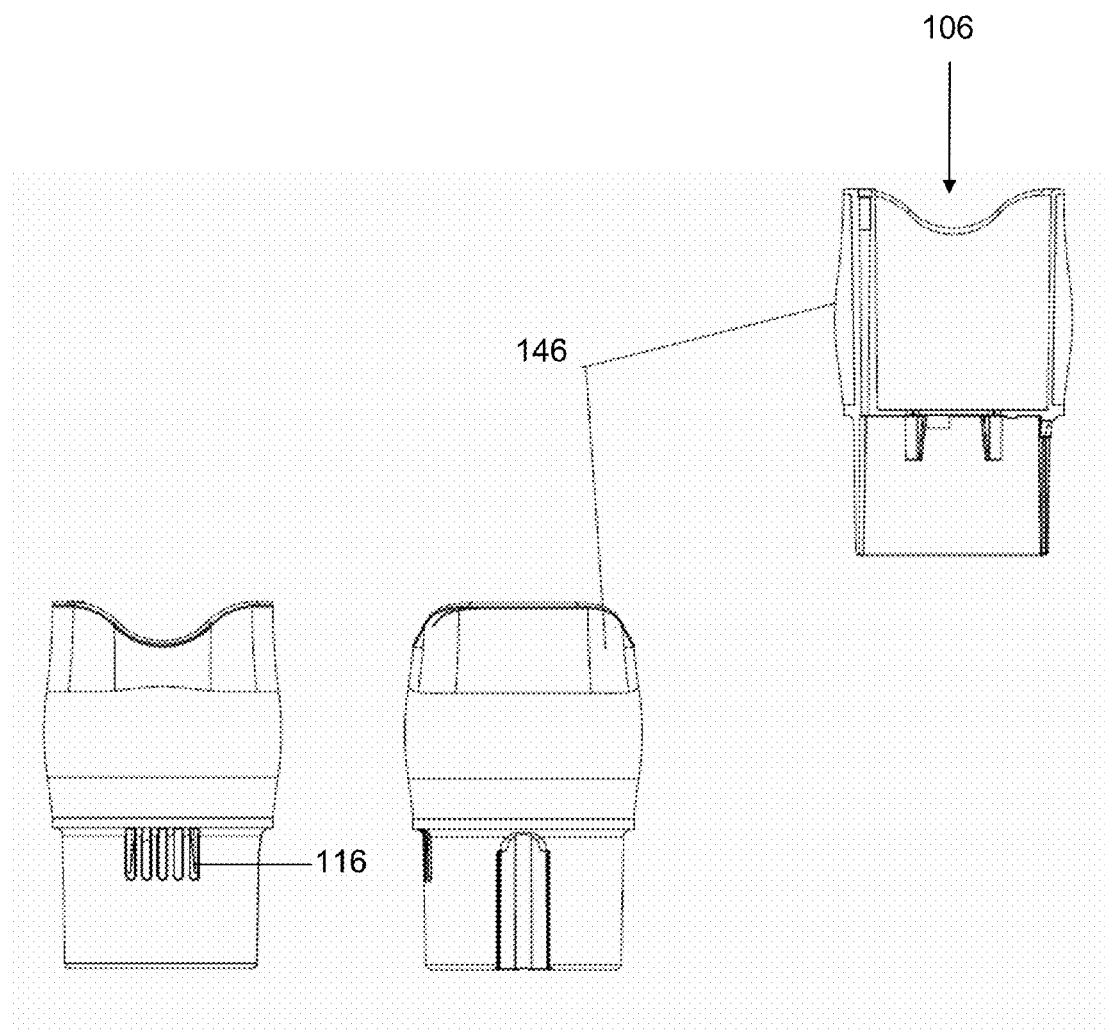
FIG. 4D illustrates various front views of the bottle housing.

Referring to each of the drawings and in particular to FIGS. 1A-1G, an embodiment of a bottle warming apparatus 100 is schematically illustrated. In FIGS. 1A-1G, the bottle warming apparatus 100 is illustratively shown to have a particular structure, however, other alternative structures, such as those described below or otherwise, may also be utilized. The bottle warming apparatus 100 may include primary components such as a bottle 102, a bottle housing 106, and a bottom cover 108 for attaching to the base of the bottle housing 106. The bottle warming apparatus 100 may also include an electronic processor for performing a variety of the operative functions described herein. Referring now also to FIGS. 2A-2H, the bottle 102 may be made of polysulfone and Bisphenol A free plastic, other types of plastic, or other suitable materials. In one embodiment, a nipple 104 may be attached to a top portion of the bottle 102 so that a baby or other user may be able to drink from the bottle 102. The nipple 104 may be attached to the top portion of the bottle 102 by utilizing a screw flange 144, as shown in FIG. 2C. The screw flange 144 may allow the nipple 104 to effectively screw into the bottle 102 so that the nipple 104 does not easily fall off.

Additionally, the bottle 102 may include a volume that may be configured to receive and store food, fluids, or other contents. The bottle 102 includes a recessed portion 142 that may be located along a bottom surface of the bottle 102. In one embodiment, the recessed portion 142 may generally have a shape that conforms to the shape of the emitter cover 112, which is described in further detail below, however, the recessed portion 142 may assume other shapes and have various depths and widths. In addition to the recessed portion 142, the bottle 102 may include a pair of indentations 114 that may be positioned on opposite sides of the bottle 102. When the bottle 102 is inserted into the bottle housing 106, one of the indentations 114 may be configured to align with the pressure-sensitive switch 128 and the other indentation 114 may be configured to align with the temperature sensor 126.

With regard to the bottle housing 106 and referring now also to FIGS. 3A-10, the bottle housing 106 may include a variety of different components and may be configured to attached to a variety of components. The bottle housing 106 may be made of polyethylene or other suitable materials and may be covered with a silicone overmould or gripping portion 146. The gripping portion 146 may allow a baby or other user to easily hold onto the bottle warming apparatus 100 as they are consuming the contents from the bottle 102. Additionally, the bottle housing 106 may including a plurality of vents 116. The vents 116 may be utilized to drain any fluid or food that may have spilled or fallen out of the bottle 102 when the bottle 102 was inserted into the bottle housing 106. By enabling the drainage of food or liquid from the vents 116, the vents 116 may protect the electronic components in the bottle warming apparatus 100 from damage.

The bottle housing 106 may also include a light source 110. The light source 110 may be a light emitting diode, a bulb, or other light source capable of emitting light that is visible to a user. In one embodiment, the light source 110 may be configured to flash once when the bottle 102 is inserted into the bottle housing 106 in order to indicate that the bottle warming apparatus 100 has been activated or turned on. Also, the light source 110 may be configured to flash multiple times or provide some other unique indication when the bottle 102 and/or the bottle warming apparatus 100 has reached an optimal temperature. Additionally, the light source 100 may flash when the bottle 102 is removed from the bottle housing 106.

Figure 8:
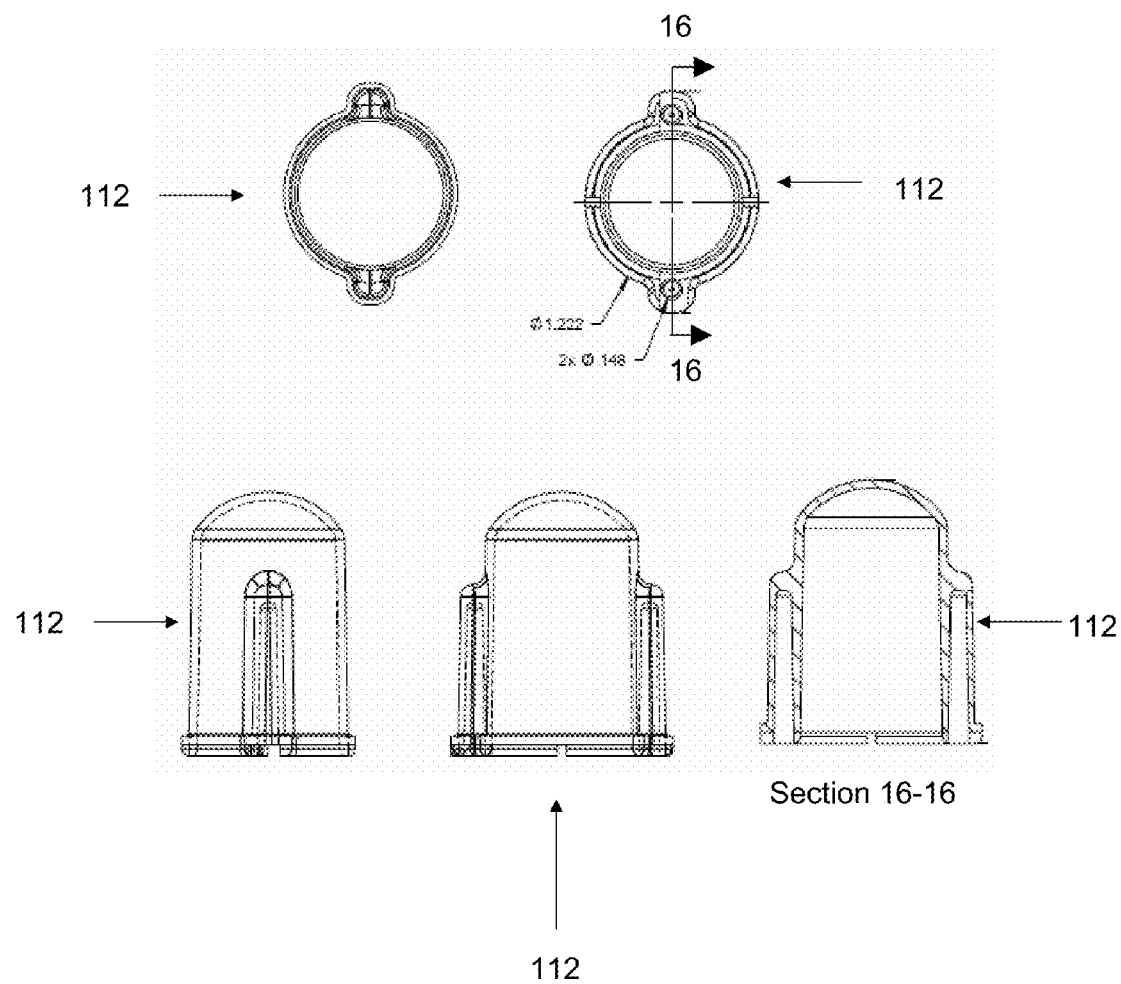
FIG. 8 illustrates top, bottom, and side views of the emitter cover of the bottle warming apparatus.

Also, the bottle housing 106 may be configured to receive and house a variety of other components. FIGS. 4A-4D provide various illustrations and views of the bottle housing 106. In one embodiment, the various components may be integrated into the bottle housing 106. Additionally, the components may be configured to connect and attach to the component mount section 130, which may have openings and a structure configured to readily attach to each of the components as illustrated in FIG. 1G and FIGS. 3A-3C by using screws 120 or other attachment means. One such component is an emitter cover 112, which is depicted in FIG. 8 and may be utilized to cover a heating element 132 such that the heating element 132 does not directly touch a surface of the bottle 102. Additionally, the emitting cover 112 may prevent a user from being burned when the user places their hand in the bottle housing 106. The emitter cover 112 may have a shape that may readily fit into the recessed portion 142 of the bottle 102 when the bottle 102 is inserted into the bottle housing 106. By having a shape that fits and conforms to the recessed portion 142, a snug and secure fit may be ensured, while also maximizing heat contact with the bottle 102. Furthermore, the emitter cover 112 may be made of polysulfone rods or other suitable materials as well.

Figure 5:
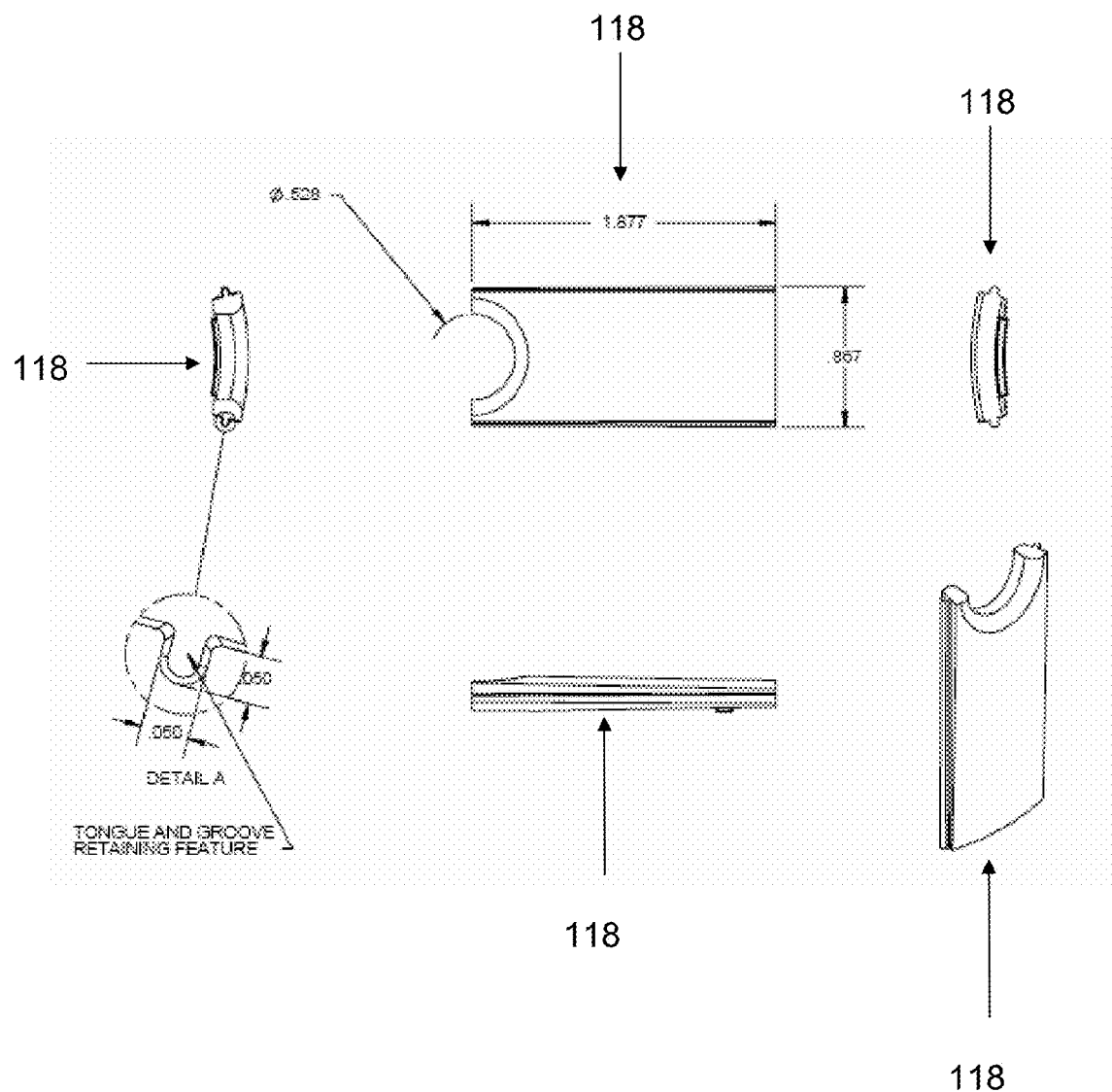
FIG. 5 illustrates various views of a power connector cover of the bottle warming apparatus.

The bottle housing 106 may house a power connector cover 118, which may be seen in FIG. 5. The power connector cover 118 may cover a bottom portion of the bottle warming apparatus 100 and may be utilized to allow the use of multiple different power cords. For example, the power connector cover 118 may enable the use of a power cord that is configured for traditional home use, a power cord that is configured for use in a vehicle, or other types of power cords. The bottle housing 106 may contain a primary and contact printed circuit board 140 for facilitating the electrical connections in the bottle warming apparatus 100. The primary circuit board 140 may be housed within the component mount section 130. Also, the bottle housing 106 may also contain a printed circuit board 136, which may be a power entry printed circuit board for facilitating electrical connections to various components in the bottle warming apparatus. The printed circuit board may connect to a connector power shield 134 as well. The bottle warming apparatus 100 may also include a fan 138, which may be utilized to regulate the temperature of the various components in the apparatus 100 and may be housed within the component mount section 130. The fan 138 may assist in ensuring that the components do not reach overly high temperatures which may damage the components.

Figure 9:
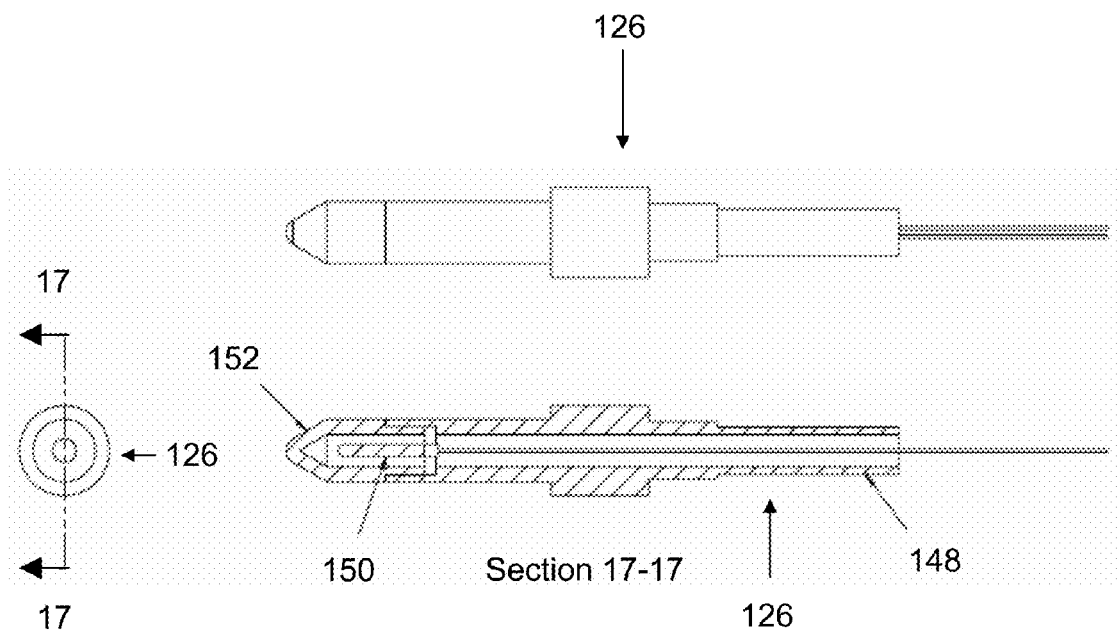
FIG. 9 illustrates side, top, and cross-sectional views of a temperature sensor of the bottle warming apparatus.
Figure 10:
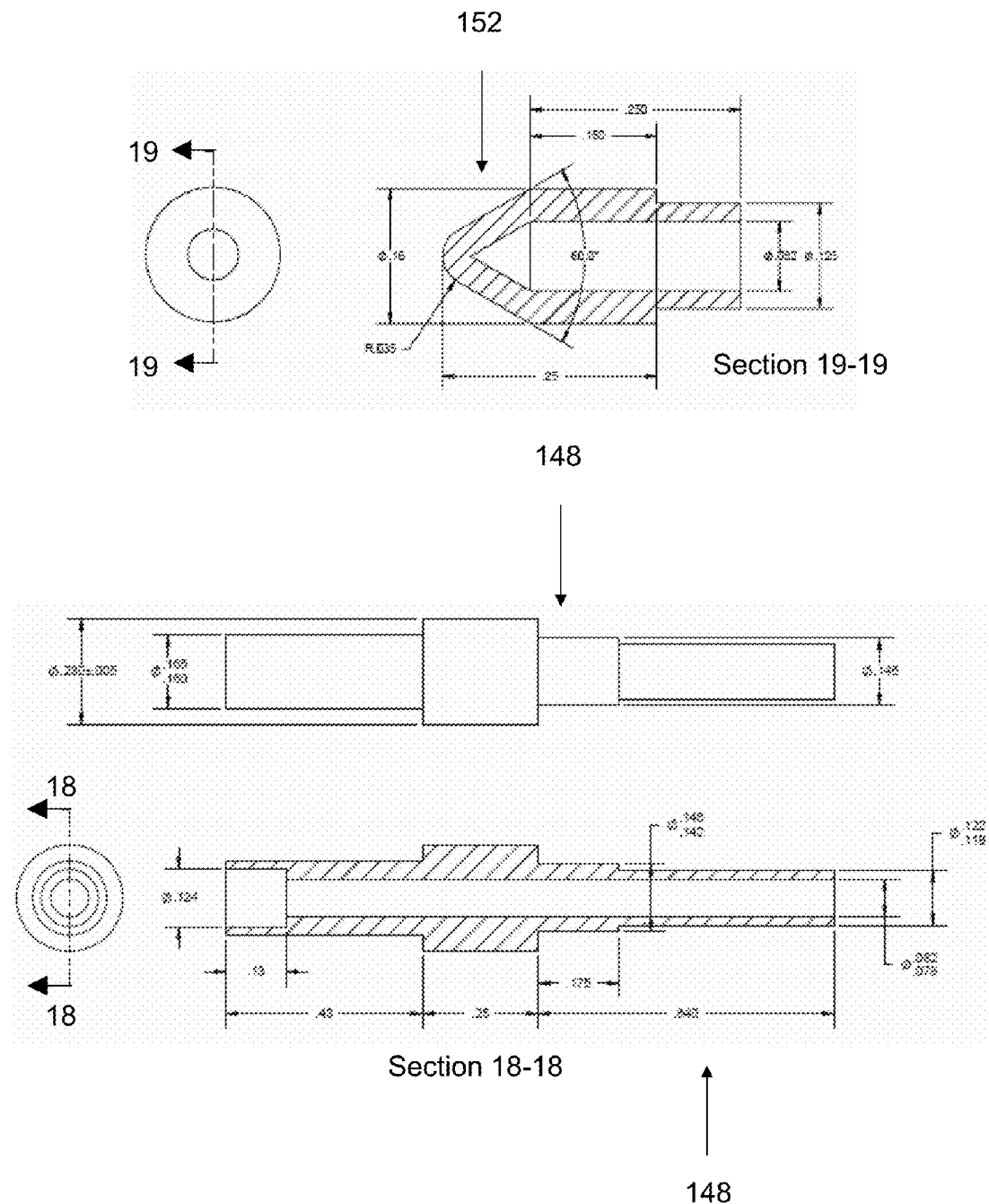
FIG. 10 illustrates top, bottom, side and cross-sectional views of thermistor mounts of the temperature sensor.

Additionally, the bottle housing 106 may include or house a temperature sensor 126. The temperature sensor 126 and its components are illustrated in FIGS. 9-10 and may be configured to measure a temperature of the bottle 102 when the bottle warming apparatus 100 is activated or otherwise. The temperature sensor 126 may regulate the temperature of the bottle warming apparatus 100, ensure that an optimal or desired temperature is reached, and ensure that the contents of the bottle 102 are not too hot or too cold. Temperature sensor 126 may transmit a signal to the bottle warming apparatus 100 to deactivate and turn off if an optimal temperature is reached. In one embodiment, the temperature sensor 126 may be configured to align with one of the indentations 114 of the bottle 102 when the bottle 102 is inserted into the bottle housing 106.

Temperature measurements recorded by the temperature sensor 126 may be processed by using the electronic processor. The processor may then store the measurements, which may be stored in a machine-readable medium. In an embodiment, the processor may display the temperature measurements on a screen of the bottle warming apparatus 100, transmit a signal to cause a light to be displayed when a certain temperature is reached, output a sound when a certain temperature is reached, and output a warning signal when the temperature is outside a predetermined threshold range. In one embodiment, a user may utilize a computing device to adjust the temperature of the bottle warming apparatus 100 based on the temperature measurements recorded by the temperature sensor 126. Additionally, the bottle warming apparatus 100 may include buttons to increase or decrease the temperature.

The temperature sensor 126 may include a negative temperature coefficient device 150 and thermistor mounts 148 and 152. The negative temperature coefficient device 150 may be a thermistor that monitors the temperature and may exhibit decreasing electrical resistance when experiencing increasing temperatures and increasing electrical resistance with decreasing temperatures. The bottle housing 106 may also be configured to house a positive temperature coefficient device 122, which may electrically connect with the temperature sensor 126. The positive temperature coefficient device 122 may include materials that may undergo an increase in electrical resistance when its temperature increases and a decrease in electrical resistance when the temperature decreases. In one embodiment, the positive temperature coefficient device 122 may be a thermistor, which may be utilized to limit current, sense temperature, and perform a variety of other functions that are traditionally associated with thermistors. In one embodiment, the positive temperature coefficient device 122 may be utilized with the temperature sensor 126 to regulate the temperature of the bottle warming apparatus 100.

Figure 7:
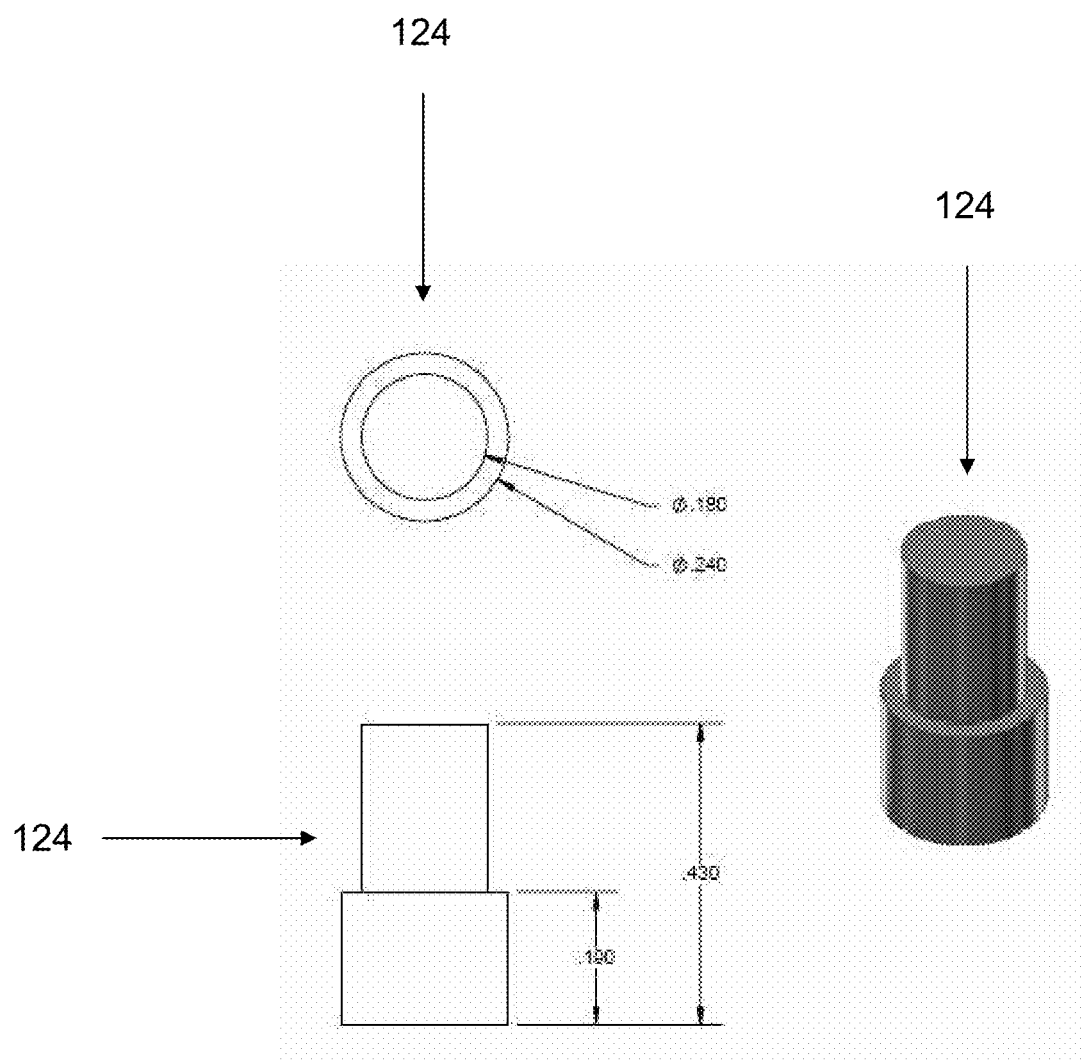
FIG. 7 illustrates isometric, top, and side views of the switch plunger of the bottle warming apparatus.

Bottle housing 106 may also be configured to house a pressure-sensitive switch 128 and a corresponding switch plunger 124, which may be seen in FIG. 7. The pressure-sensitive switch 128 may be positioned across from the temperature sensor 126 and may be configured to align with the other indentation 114 when the bottle 102 is inserted into the bottle housing 106. When the bottle 102 is inserted into the bottle housing 106, the pressure-sensitive switch 128 and/or the corresponding switch plunger 124 may be pushed down by the bottle 102 such that the pressure-sensitive switch 128 may activate or turn on the bottle warming apparatus. Once the bottle warming apparatus 100 is activated, the heating element 132, which may be a ceramic heating element or other types of suitable heating elements, may generate heat to warm the bottle 102. In one embodiment, the pressure-sensitive switch 128 and/or the switch plunger 124 may only be configured to activate the bottle warming apparatus when a predetermined amount of pressure is applied. For example, if the bottle 102 is empty, the pressure exerted by the bottle 102 alone may not be enough to trigger activation in one embodiment. However, if the bottle 102 is filled with fluid, the weight may be enough to trigger activation.

Figure 6:
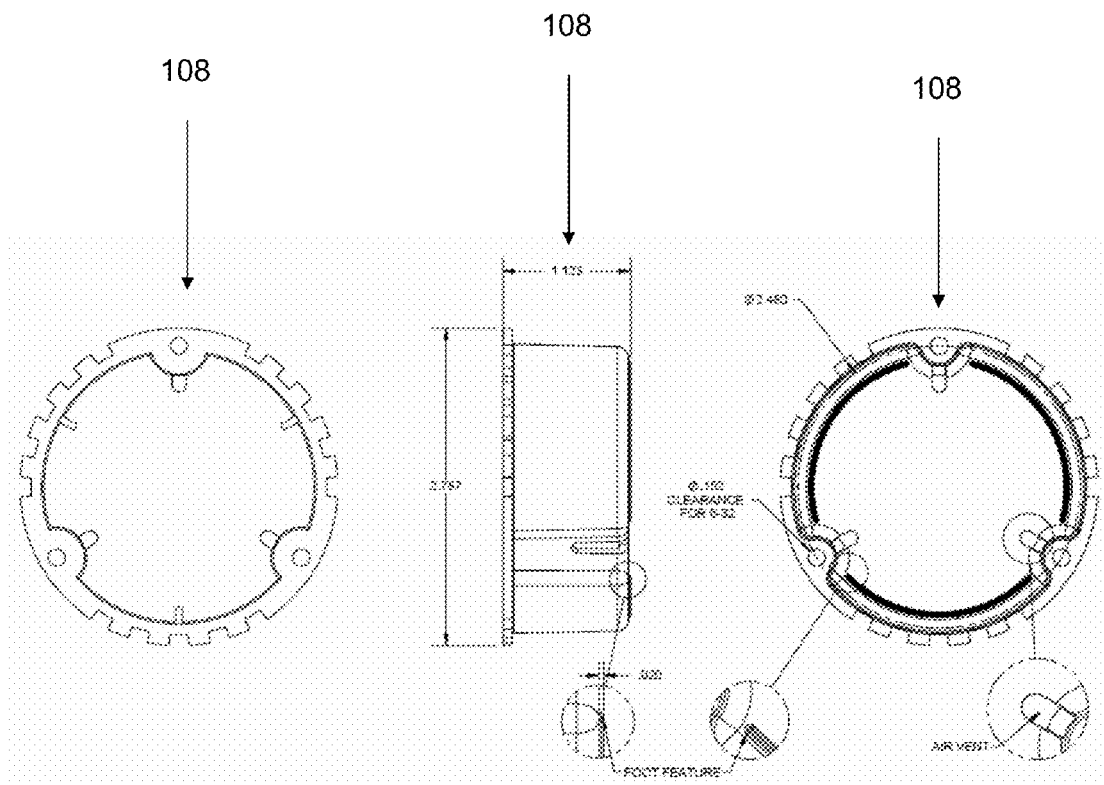
FIG. 6 illustrates top, bottom, and side views of the bottom cover of the bottle warming apparatus.

The bottle housing 106 may connect to the bottom cover 108, which is illustrated in FIG. 6. The bottom cover 108 may be attached to the bottle warming apparatus 100 using screws 120 as shown in FIG. 1G. Notably, the bottom cover 108 may be utilized to shield a user from accessing the various components housed in the bottle housing 106 directly. The bottle warming apparatus 100 may receive power via an AC/DC adaptor, an automotive adaptor, solar power, or any other suitable adaptor.

Operatively, the bottle warming apparatus 100 may operate, in one embodiment, as follows: A user may desire to warm food or drinks and may utilize the bottle warming apparatus 100 to do so. The user may insert the bottle 102 containing the food or drinks into the bottle housing 106 in order to activate the bottle warming apparatus 100. The bottle warming apparatus 100 may be activated when the bottle 102 exerts enough pressure to push down against the switch plunger 124 and/or pressure-sensitive switch 128. At this point, a sound may be outputted and a light source 110 may emit light to indicate to the user that the apparatus 100 is activated. When the bottle 102 is inserted into the bottle housing 106, one of the indentations 114 of the bottle 102 may align with the pressure-sensitive switch 128 and the other indentation 114 may align with the temperature sensor 126.

Once the bottle warming apparatus 100 is activated, a signal may be transmitted to cause the heating element 132 to start generating heat to warm the contents of the bottle 102. The heating element 132, may be configured to fit into the recessed portion 142 of the bottle 102, so that the heat generated from the heating element 132 can readily transfer to the contents of the bottle 102. As the heating element 132 warms the bottle 102, the temperature sensor 126 can monitor the temperature of the bottle 102 and bottle warming apparatus 100. If the temperature is below an optimal temperature, the heating element 132 can continue to generate heat to warm the contents of the bottle 102. However, if the temperature reaches the optimal temperature, the temperature sensor 126 can transmit a signal to deactivate or turn off the bottle warming apparatus 100. Additionally, the bottle warming apparatus 100 can emit a sequence of sounds or multiple flashes of light to indicate that the optimal temperature has been reached.

If the user does not remove the bottle 102 from the bottle housing 106 and the bottle warming apparatus 100 has been deactivated, then the temperature of the contents of the bottle 102 may decrease below the optimal temperature. At this point, the temperature sensor 126 may send a signal to reactivate the bottle warming apparatus 100 and cause the heating element 132 to heat the bottle 102 again so that the temperature may once again increase to the optimal temperature. Once the optimal temperature is reached again, the bottle warming apparatus 100 may emit the sequence of sounds and/or flashes to indicate that the contents of the bottle 102 are ready to be consumed. If the user decides to take the bottle 102 out of the bottle housing 106, the pressure-sensitive switch 128 and plunger 124 may retract to their original positions and the bottle warming apparatus 100 may automatically shut off.

In one embodiment, a different bottle warming apparatus may be provided. The apparatus may include a bottle, which can include a recessed pocket which can be configured to receive an electrically powered and electronically regulated infrared core, which may correlate to heating element 132, for example. The infrared core may be utilized to rapidly heat fluids and may be configured to maintain a predetermined or adjustably controlled temperature by utilizing infrared light energy. The bottle may also include an insulated enclosure case/bottle housing with reflective lining. The reflective lining may be utilized to bounce infrared energy back inward through liquid in the bottle as it retains heat in order to maximize heating efficiency. In one embodiment, insulation material may flexibly surround the bottle, which may reduce air gaps between the reflective lining of the enclosure case and the bottle. In one embodiment, the infrared core may be mountable to the enclosure case which can fit into a standard size cup holder and may be configured to stand alone on a counter top, table, or the ground.

Additionally, in one embodiment, the enclosure case may contain an electronic circuit board, which may include temperature sensing components, data processing components, power regulating components, and optional batteries. In another embodiment, the enclosure case may also have a plug attached to the unit, which may override the batteries and power the unit. This may allow the user to plug in the unit into a car using a car charger or at home using a wall charger. Additionally, the plug may also provide the user with the convenience of not having to buy or use batteries. In an embodiment, the unit can be electrically powered with direct AC or DC current using batteries, automotive adapter (such as a cigarette lighter), and/or an AC outlet adapter.

Notably, features of the bottle warmers/warming apparatuses described herein can be combined or otherwise associated with the other apparatuses described above and/or the methods described below.

Figure 11:
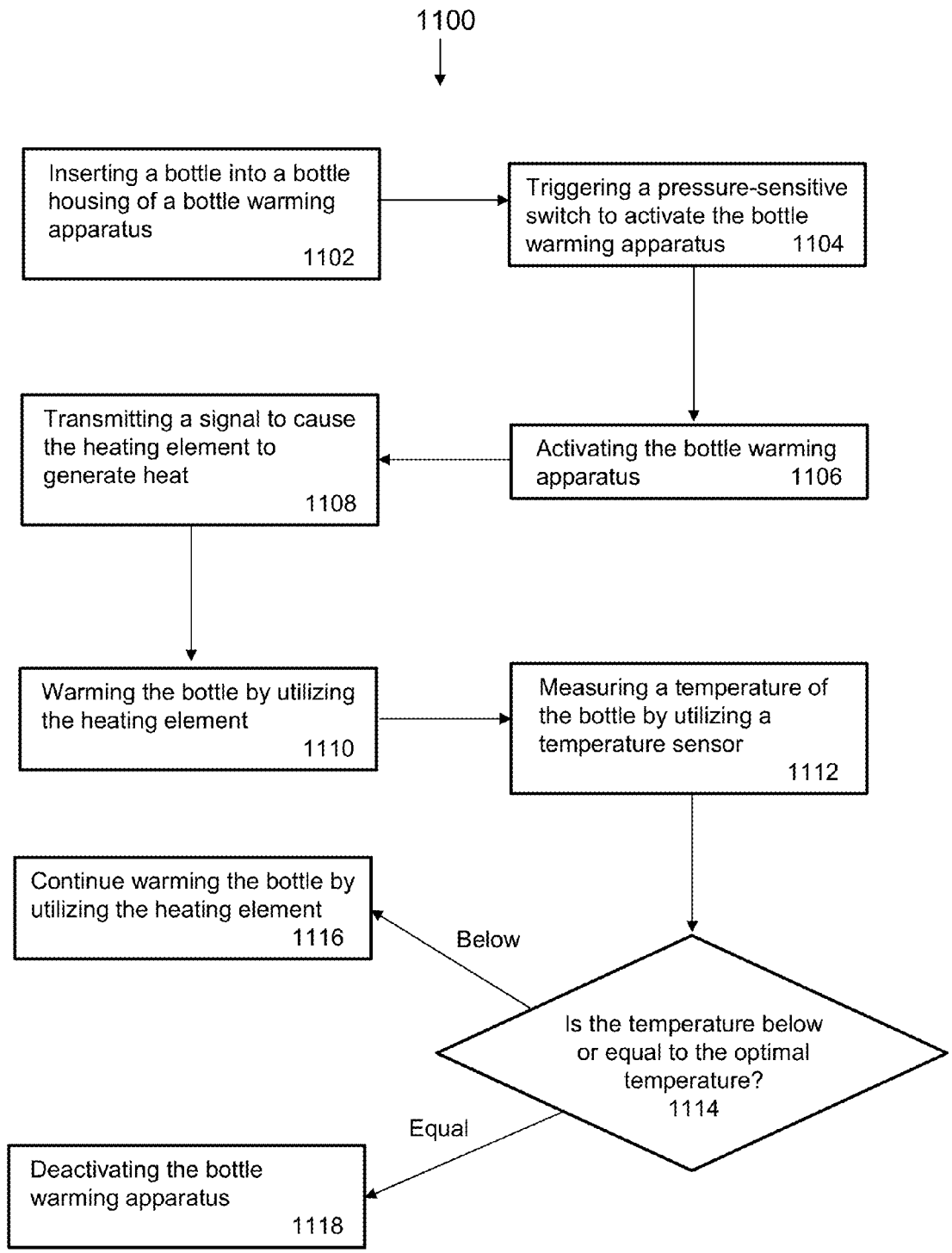
FIG. 11 illustrates an embodiment of a method for warming a bottle using a bottle warming apparatus.

Referring now to FIG. 11, an illustrative method 1100 for warming a bottle using a bottle warming apparatus is schematically illustrated. Notably, the method 1100 is not intended to be limited to the apparatuses and components described above or illustrated in the drawings. The method 1100 may begin with step 1102, which may include inserting a bottle into a bottle housing of the bottle warming apparatus. The bottle may have a volume for receiving and storing food, fluids, or other contents. Additionally, the bottle may include a recessed portion and a pair of indentations positioned on opposite sides of the bottle. At step 1104, the method 1100 may include triggering a pressure-sensitive switch so as to activate the bottle warming apparatus. In one embodiment, the pressure-sensitive switch may activate the bottle warming apparatus when the bottle is inserted into the bottle housing of the warming apparatus. Also, the pressure-sensitive switch may be configured to align with the first indentation of the bottle such that when aligned with the indentation, the bottle exerts enough pressure on the switch to trigger activation of the bottle warming apparatus.

At step 1106, the method 1100 may include activating the bottle warming apparatus after triggering the pressure-sensitive switch. The bottle warming apparatus may be powered through the use of batteries, electrical adapters, automotive adapters, solar power, or other power sources that may be utilized in activating the warming apparatus. Once the bottle warming apparatus is activated and turned on, the method 1100 may include transmitting a signal to a heating element to generate heat for warming the bottle at step 1108. The heating element may be positioned such that when the bottle is inserted into the bottle housing, the heating element is positioned into the recessed portion of the bottle. Such positioning may allow the heating element to readily warm the contents of the bottle. At step 1110, the method 1100 may include warming the bottle by utilizing the heating element.

At step 1112, the method 1100 may include measuring a temperature of the bottle and/or warming apparatus by utilizing a temperature sensor. The temperature sensor may be configured to be aligned with the second indentation of the bottle when the bottle is inserted into the bottle housing of the bottle warming apparatus. The method 1100, at step 1114, may include determining if the temperature is either below or equal to an optimal temperature. if the temperature sensor determines that the temperature is currently below the optimal temperature, the heating element can continue to warm the bottle at step 1116. However, if the temperature sensor determines that the temperature is currently at the optimal temperature, the method 1100 may include deactivating or turning off the bottle warming apparatus at step 1118. In one embodiment, the method 1100 may include determining whether the temperature is greater than the optimal temperature. If the temperature is greater than the optimal temperature, a warning signal may be outputted in the form of a visual display, a sound, or a combination thereof.

In one embodiment, the method 1100 may also include activating a light source when the bottle is inserted into the bottle housing. The light source may be a bulb, a light emitting a diode, or any other type of light source that may be located on the bottle housing such that the light emitted from the light source may be readily seen by a user of the bottle warming apparatus. The emission of light from the light source may indicate that the bottle warming apparatus is switched on or activated. The method 1100 may further include, in one embodiment, reactivating the bottle warming apparatus when the temperature sensor determines that the temperature of the bottle or apparatus falls below the optimal temperature. The reactivation of the bottle warming apparatus may help to keep the contents of the bottle warm until the user is ready to consume the contents. Once the temperature has reached the optimal temperature again, the method 100 may include deactivating the bottle warming apparatus again.

In one embodiment, the method 1100 may include deactivating the bottle warming apparatus when the bottle is removed from the bottle housing. Additionally, the method 1100 may include outputting a sound when the bottle is removed from the bottle housing. Different sounds or a sequence of sounds may be outputted when the temperature of the bottle or the bottle warming apparatus reach the optimal temperature. The method 1100 may also include only triggering the pressure-sensitive switch when the bottle is inserted into the bottle housing at a predetermined pressure or when the contents of the bottle have a certain weight to exert enough pressure to equal the predetermined pressure. In one embodiment, the method 1100 may further include not triggering the pressure-sensitive switch when an empty bottle is inserted into the bottle housing.

Notably, the method 1100 may incorporate any of the functionality, components, or features described for the various bottle warmers and warming apparatuses described above and is not intended to be limited to the description above.

Upon reviewing the aforementioned embodiments, it would be evident to an artisan with ordinary skill in the art that said embodiments can be modified, reduced, or enhanced without departing from the scope and spirit of the claims described below.

At least a portion of the methodologies and techniques described with respect to the exemplary embodiments can incorporate a machine or other computing device within which a set of instructions, when executed, may cause the machine to perform any one or more of the methodologies or functions discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The machine may include a processor (e.g., a central processing unit (CPU), a graphics processing unit (GPU, or both), a main memory and a static memory, which communicate with each other via a bus. The machine may further include a video display unit (e.g., a liquid crystal display (LCD), a flat panel, a solid state display, or a cathode ray tube (CRT)). The machine may include an input device (e.g., a keyboard), a cursor control device (e.g., a mouse), a disk drive unit, a signal generation device (e.g., a speaker or remote control) and a network interface device.

The disk drive unit may include a machine-readable medium on which is stored one or more sets of instructions (e.g., software) embodying any one or more of the methodologies or functions described herein, including those methods illustrated above. The instructions may also reside, completely or at least partially, within the main memory, the static memory, and/or within the processor during execution thereof by the machine. The main memory and the processor also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions, or that which receives and executes instructions from a propagated signal so that a device connected to a network environment can send or receive voice, video or data, and to communicate over the network using the instructions. The instructions may further be transmitted or received over a network via the network interface device.

While the machine-readable medium is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Many other arrangements will be apparent to those of skill in the art upon reviewing the above description. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

What is claimed is:

1. A bottle warming apparatus, the apparatus comprising:
a bottle including a first volume configured to receive and store at least one of food or fluid, wherein the bottle includes a first recessed portion and first and second indentations positioned on opposite sides of the bottle, wherein the bottle further includes a second recessed portion positioned on a bottom portion of the bottle;
a bottle housing for enclosing the bottle, wherein an inner wall of the bottle housing defines a second volume having a size and shape for receiving at least a portion of the bottle;
a heating element configured to position within the first recessed portion of the bottle when the bottle is positioned into the bottle housing;
a pressure-sensitive switch within the bottle housing that aligns relative with the first indentation of the bottle such that when the pressure-sensitive switch is aligned with the first indentation, the bottle applies an amount of pressure against the pressure-sensitive switch to trigger activation of the bottle warming apparatus, wherein the heating element generates and transmits heat to the bottle when the bottle warming apparatus is activated; and
a temperature sensor for measuring a temperature of the bottle, wherein the temperature sensor aligns relative with the second indentation when the bottle is positioned into the bottle housing, wherein a portion of the temperature sensor resides within the second recessed portion when the bottle is positioned into the bottle housing, wherein a portion of a temperature coefficient device for regulating the temperature resides within the first recessed portion when the bottle is positioned into the bottle housing, wherein the temperature sensor transmits a signal to the bottle warming apparatus to deactivate when an optimal temperature is reached.

2. The bottle warming apparatus of claim 1, further comprising a power source for providing power to the bottle warming apparatus, wherein the power source comprises one of a battery, an electrical adapter, an automotive adapter, or a solar power source.

3. The bottle warming apparatus of claim 1, further comprising a light source configured to turn on when the bottle is first positioned into the bottle housing and after the bottle warming apparatus is activated.

4. The bottle warming apparatus of claim 3, wherein the light source is configured to turn off and on for a predetermined number of times when the temperature sensor determines that the optimal temperature is reached.

5. The bottle warming apparatus of claim 1, wherein the temperature sensor is configured to transmit a reactivation signal to the bottle warming apparatus to reactivate the bottle warming apparatus when the temperature sensor determines that the temperature of the bottle has fallen below the optimal temperature.

6. The bottle warming apparatus of claim 1, wherein when the bottle is removed from the bottle housing and the pressure is removed from the pressure-sensitive switch, a deactivation signal is transmitted to the bottle warming apparatus to deactivate the bottle warming apparatus.

7. The bottle warming apparatus of claim 1, further comprising an emitter cover configured to cover the heating element to prevent the heating element from directly touching the bottle, wherein the emitter cover is configured to position within the first recessed portion of the bottle.

8. The bottle warming apparatus of claim 1, wherein the pressure-sensitive switch only activates the bottle warming apparatus when the pressure applied by the bottle is greater than a predetermined pressure.

9. The bottle warming apparatus of claim 1, further comprising an electronic processor, wherein the processor is configured to perform at least one of display the temperature, output a sound when the bottle is first positioned into the bottle housing, output a sound when the optimal temperature is reached, and output a warning when the temperature is outside a predetermined temperature range.

10. The bottle warming apparatus of claim 1, further comprising a power connector cover for covering a bottom portion of the bottle warming apparatus, wherein the power connector cover enables the use of multiple power cords for powering the bottle warming apparatus.

11. The bottle warming apparatus of claim 1, further comprising covering the bottle housing with a molded gripping portion so that a user may readily grip the bottle warming apparatus, and wherein a top surface of the bottle housing has curvatures along a circumference of the top surface that enable the bottle to be readily removed from the bottle housing.

12. A bottle warming apparatus, the apparatus comprising:
   a bottle including a first volume configured to receive and store at least one of food or fluid, wherein the bottle includes a first recessed portion and an indentation positioned on a side of the bottle, wherein the bottle further includes a second recessed portion positioned on a bottom portion of the bottle;
   a bottle housing having an inner wall defining a second volume for receiving at least a portion of the bottle, wherein the bottle housing includes a reflective lining on the inner wall;
   a heating element configured to position within the first recessed portion of the bottle when the bottle is positioned into the bottle housing, wherein the heating element is an infrared core;
   a pressure-sensitive switch within the bottle housing that aligns relative with the indentation of the bottle such that when the pressure-sensitive switch is aligned with the indentation, the bottle applies an amount of pressure against the pressure-sensitive switch to trigger activation of the bottle warming apparatus, wherein the heating element generates and transmits heat to the bottle based on activating the bottle warming apparatus, wherein the reflective lining of the bottle housing causes infrared energy to bounce back towards the bottle while the heating element generates and transmits the heat; and
   a temperature sensor for measuring a temperature of the bottle, wherein a portion of the temperature sensor resides within the second recessed portion when the bottle is positioned into the bottle housing, wherein a portion of a temperature coefficient device for regulating the temperature resides within the first recessed portion when the bottle is positioned into the bottle housing, wherein the temperature sensor transmits a signal to the bottle warming apparatus to deactivate the bottle warming apparatus when an optimal temperature is reached.

13. A method for warming a bottle using a bottle warming apparatus, the method comprising:
   inserting a bottle into a bottle housing of the bottle warming apparatus, wherein the bottle includes a first volume for receiving and storing at least one of food or fluid, wherein the bottle includes a first recessed portion and first and second indentations positioned on opposite sides of the bottle, wherein the bottle further includes a second recessed portion positioned on a bottom portion of the bottle, wherein an inner wall of the bottle housing defines a second volume having a size and shape for receiving at least a portion of the bottle;
   triggering a pressure-sensitive switch to activate the bottle warming apparatus when the bottle is inserted into the bottle housing, wherein the pressure-sensitive switch is configured to align relative with the first indentation of the bottle such that when the pressure-sensitive switch is aligned with the first indentation, the bottle applies an amount of pressure against the press-sensitive switch to trigger activation of the bottle warming apparatus;
   activating the bottle warming apparatus after triggering the pressure-sensitive switch, wherein the bottle warming apparatus transmits a signal to a heating element to generate heat, wherein the heating element is configured to position within the first recessed portion of the bottle when the bottle is inserted into the bottle housing;
   warming the bottle by utilizing the heating element, wherein the heating element generates and transmits heat to the bottle when the bottle warming apparatus is activated;
   measuring a temperature of the bottle by utilizing a temperature sensor, wherein the temperature sensor aligns relative with the second indentation when the bottle is inserted into the bottle housing, wherein a portion of the temperature sensor resides within the second recessed portion when the bottle is positioned into the bottle housing, wherein a portion of a temperature coefficient device for regulating the temperature resides within the first recessed portion when the bottle is positioned into the bottle housing; and
   deactivating the bottle warming apparatus and the heating element when the temperature reaches an optimal temperature.

14. The method of claim 13, further comprising providing power to the bottle warming apparatus by utilizing a power source, wherein the power source comprises one of a battery, an electrical adapter, an automotive adapter, or a solar power source.

15. The method of claim 13, further comprising activating a light source when the bottle is inserted into the bottle housing, wherein the light source is one of a light emitting diode or a bulb.

16. The method of claim 13, further comprising reactivating the bottle warming apparatus and the heating element when the temperature sensor determines that the temperature falls below the optimal temperature.

17. The method of claim 16, further comprising deactivating the bottle warming apparatus after reactivating the bottle warming apparatus when the temperature reaches the optimal temperature again.

18. The method of claim 13, further comprising deactivating the bottle warming apparatus when the bottle is removed from the bottle housing.

19. The method of claim 13, further comprising outputting a sound when the bottle is removed from the bottle housing, and further comprising outputting a sequence of sounds when the temperature reaches the optimal temperature.

20. The method of claim 13, further comprising triggering the pressure-sensitive switch only when a predetermined pressure is exerted by the bottle onto the pressure-sensitive switch.

* * * * *